(12) United States Patent
Wagner et al.

(10) Patent No.: US 10,649,445 B2
(45) Date of Patent: May 12, 2020

(54) SYSTEMS AND METHODS FOR STORING, RETRIEVING AND PROCESSING OBJECTS INCLUDING STACKABLE SEMICIRCULAR TOWERS

(71) Applicant: Berkshire Grey, Inc., Lexington, MA (US)

(72) Inventors: Thomas Wagner, Concord, MA (US); Kevin Ahearn, Fort Mill, SC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Pittsburgh, PA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Somerville, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

(*) Notice: Subject to any disclaimer, the term of this patent is extended or adjusted under 35 U.S.C. 154(b) by 0 days.

(21) Appl. No.: 15/922,310

(22) Filed: Mar. 15, 2018

(65) Prior Publication Data
US 2018/0265298 A1 Sep. 20, 2018

Related U.S. Application Data
(60) Provisional application No. 62/471,656, filed on Mar. 15, 2017.

(51) Int. Cl.
*G05B 19/418* (2006.01)
*B66F 9/06* (2006.01)
(Continued)

(52) U.S. Cl.
CPC ...... *G05B 19/41895* (2013.01); *B25J 9/0093* (2013.01); *B65G 1/045* (2013.01);
(Continued)

(58) Field of Classification Search
CPC ......... B65G 1/045; B65G 1/065; B66F 9/063; G05B 19/41895
See application file for complete search history.

(56) References Cited

U.S. PATENT DOCUMENTS

| 4,678,390 | A | 7/1987 | Bonneton et al. |
| 4,722,653 | A | 2/1988 | Williams et al. |

(Continued)

FOREIGN PATENT DOCUMENTS

| CA | 2985166 A1 | 12/2016 |
| CN | 106395225 A | 2/2017 |

(Continued)

OTHER PUBLICATIONS

Communication pursuant to Rules 161(1) and 162 EPC issued by the European Patent Office dated Oct. 22, 2019, 3 pages.
(Continued)

*Primary Examiner* — Thomas Randazzo
(74) *Attorney, Agent, or Firm* — Gesmer Updegrove LLP

(57) ABSTRACT

A storage, retrieval and processing system is disclosed for processing objects. The system includes a plurality of bins including objects to be distributed by the processing system, said plurality of bins being provided in at least a partially generally circular arrangement, a programmable motion device that includes an end effector for grasping and moving any of the objects, said programmable motion device being capable of reaching any of the objects within the plurality of bins, and a plurality of destination containers for receiving any of the objects from the plurality of bins, said plurality of destination containers being provided in a region that is generally within the at least partially generally circular arrangement of the plurality of bins.

20 Claims, 27 Drawing Sheets

(51) Int. Cl.
  *B25J 9/00* (2006.01)
  *B65G 1/04* (2006.01)
  *B65G 1/137* (2006.01)
  *B65G 1/06* (2006.01)

(52) U.S. Cl.
  CPC .......... *B65G 1/065* (2013.01); *B65G 1/1373* (2013.01); *B65G 1/1378* (2013.01); *B66F 9/063* (2013.01); *B65G 2201/0258* (2013.01)

(56) References Cited

U.S. PATENT DOCUMENTS

| | | | |
|---|---|---|---|
| 4,846,619 A * | 7/1989 | Crabtree | B65G 1/0435 414/273 |
| 4,869,813 A * | 9/1989 | Bailey | B07C 5/3422 209/538 |
| 5,281,081 A * | 1/1994 | Kato | B65G 1/1378 414/789.6 |
| 5,595,263 A | 1/1997 | Pignataro | |
| 6,011,998 A | 1/2000 | Lichti et al. | |
| 6,036,812 A * | 3/2000 | Williams | B65G 1/045 156/277 |
| 6,377,867 B1 | 4/2002 | Bradley et al. | |
| 6,390,756 B1 | 5/2002 | Isaacs et al. | |
| 6,505,093 B1 | 1/2003 | Thatcher et al. | |
| 6,579,053 B1 | 6/2003 | Grams et al. | |
| 6,685,031 B2 | 2/2004 | Takizawa | |
| 7,861,844 B2 | 1/2011 | Hayduchok et al. | |
| 8,718,814 B1 | 5/2014 | Clark et al. | |
| 8,952,284 B1 | 2/2015 | Wong et al. | |
| 8,972,045 B1 | 3/2015 | Mountz et al. | |
| 9,020,632 B2 * | 4/2015 | Naylor | B65G 1/065 414/273 |
| 9,120,622 B1 | 9/2015 | Elazary et al. | |
| 9,481,518 B2 | 11/2016 | Neiser | |
| 9,694,977 B2 | 7/2017 | Aprea et al. | |
| 9,751,693 B1 * | 9/2017 | Battles | G06Q 10/087 |
| 9,821,464 B2 | 11/2017 | Stiernagle et al. | |
| 10,029,865 B1 * | 7/2018 | McCalib, Jr. | B65G 1/06 |
| 2002/0092801 A1 | 7/2002 | Dominguez | |
| 2002/0134056 A1 | 9/2002 | Dimario et al. | |
| 2002/0179502 A1 | 12/2002 | Cerutti et al. | |
| 2003/0038065 A1 | 2/2003 | Pippin et al. | |
| 2003/0075051 A1 * | 4/2003 | Watanabe | B65B 5/105 99/325 |
| 2005/0002772 A1 | 1/2005 | Stone | |
| 2005/0220600 A1 | 10/2005 | Baker et al. | |
| 2006/0045672 A1 * | 3/2006 | Maynard | B25J 5/02 414/276 |
| 2008/0181753 A1 * | 7/2008 | Bastian | B65G 1/026 414/277 |
| 2008/0269960 A1 | 10/2008 | Kostmann | |
| 2011/0238207 A1 * | 9/2011 | Bastian, II | B65G 61/00 700/217 |
| 2011/0243707 A1 * | 10/2011 | Dumas | B65B 5/105 414/806 |
| 2012/0328397 A1 * | 12/2012 | Yamashita | B65G 1/065 414/282 |
| 2013/0334158 A1 * | 12/2013 | Koch | B65G 67/603 212/291 |
| 2014/0086714 A1 | 3/2014 | Malik | |
| 2014/0244026 A1 * | 8/2014 | Neiser | B65G 1/1373 700/216 |
| 2014/0277693 A1 | 9/2014 | Naylor | |
| 2014/0364998 A1 | 12/2014 | Neiser et al. | |
| 2015/0098775 A1 | 4/2015 | Razumov | |
| 2015/0114799 A1 * | 4/2015 | Hansl | B65G 1/1378 198/601 |
| 2015/0203297 A1 * | 7/2015 | Manning | G07F 11/54 700/218 |
| 2016/0176638 A1 | 6/2016 | Toebes | |
| 2016/0325934 A1 * | 11/2016 | Stiernagle | G07F 11/165 |
| 2017/0043953 A1 | 2/2017 | Battles et al. | |
| 2017/0080846 A1 * | 3/2017 | Lord | B60K 7/00 |
| 2017/0121114 A1 * | 5/2017 | Einav | B65D 21/0235 |
| 2017/0174431 A1 * | 6/2017 | Borders | B65G 1/06 |
| 2017/0305668 A1 | 10/2017 | Bestic et al. | |
| 2017/0322561 A1 | 11/2017 | Stiernagle | |
| 2018/0085788 A1 | 3/2018 | Engel et al. | |
| 2018/0244473 A1 * | 8/2018 | Mathi | B65G 13/02 |
| 2019/0033837 A1 * | 1/2019 | Zanger | B66F 9/147 |

FOREIGN PATENT DOCUMENTS

| | | | |
|---|---|---|---|
| DE | 957200 | 1/1957 | |
| DE | 0235488 A1 | 4/1986 | |
| DE | 19857282 A1 | 6/2000 | |
| DE | 20011842 U1 | 3/2001 | |
| DE | 102007023909 A1 | 11/2008 | |
| DE | 102014111396 A1 | 2/2016 | |
| EP | 0767113 A2 | 9/1997 | |
| EP | 1695927 A2 | 8/2006 | |
| EP | 2062837 A1 | 5/2009 | |
| EP | 3000773 A1 | 3/2016 | |
| EP | 3112295 A1 | 4/2017 | |
| FR | 2036682 | 1/1969 | |
| FR | 2174163 | 2/1973 | |
| GB | 2539562 A | 12/2016 | |
| JP | 54131278 A * | 10/1979 | B65G 1/00 |
| JP | 63310406 A | 12/1988 | |
| JP | 0395001 A | 4/1991 | |
| JP | 08157016 A | 6/1996 | |
| JP | 200367053 A | 3/2003 | |
| JP | 2007182286 A | 7/2007 | |
| JP | 2008037567 A | 2/2008 | |
| JP | 2014141313 A | 8/2014 | |
| NO | 20150758 A1 | 12/2016 | |
| WO | 03095339 A | 11/2003 | |
| WO | 2005118436 A1 | 12/2005 | |
| WO | 2007007354 A1 | 1/2007 | |
| WO | 2008091733 A2 | 7/2008 | |
| WO | 2010017872 A1 | 2/2010 | |
| WO | 2011128384 A1 | 10/2011 | |
| WO | 2015140216 A1 | 3/2015 | |
| WO | 2016198565 A1 | 12/2016 | |
| WO | 2017081281 A1 | 5/2017 | |
| WO | 2017148939 A1 | 9/2017 | |

OTHER PUBLICATIONS

International Preliminary Report on Patentability for International Application No. PCT/US2018/022654 dated Sep. 17, 2019, 11 pages.

International Search Report & Written Opinion issued by International Searching Authority in related International Patent Application PCT/US2018/022654 dated Jun. 15, 2018, 16 pgs.

\* cited by examiner

SYSTEMS AND METHODS FOR STORING, RETRIEVING AND PROCESSING OBJECTS INCLUDING STACKABLE SEMICIRCULAR TOWERS

PRIORITY

The present application claims priority to U.S. Provisional Patent Application Ser. No. 62/471,656 filed Mar. 15, 2017, the disclosure of which is hereby incorporated by reference in its entirety.

BACKGROUND

The invention generally relates to storage and retrieval systems, and relates in particular to automated storage and retrieval systems that are used with systems for processing objects.

Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an embodiment, the invention provides a storage, retrieval and processing system for processing objects. The system includes a plurality of bins including objects to be distributed by the processing system, said plurality of bins being provided in at least a partially generally circular arrangement, a programmable motion device that includes an end effector for grasping and moving any of the objects, said programmable motion device being capable of reaching any of the objects within the plurality of bins, and a plurality of destination containers for receiving any of the objects from the plurality of bins, said plurality of destination containers being provided in a region that is generally within the at least partially generally circular arrangement of the plurality of bins.

In accordance with another embodiment, the invention provides a storage, retrieval and processing system for processing objects that includes a plurality vertically stacked levels of a plurality of bins including objects to be distributed by the processing system, a programmable motion device, and at least one destination container for receiving any of the objects from the plurality of levels of the plurality of bins. The plurality of bins is provided in at least a partially generally circular arrangement. The programmable motion device includes an end effector for grasping and moving any of the objects, and is capable of reaching any of the objects within the plurality of levels of the plurality of bins. The at least one destination container is provided in a region that is generally within the at least partially generally circular arrangement of the plurality of bins and is movable with the programmable motion device.

In accordance with a further embodiment, the invention provides a method of storing, retrieving and processing objects. The method includes the steps of providing a plurality of bins including objects to be processed, said plurality of bins being provided in at least a partially circular arrangement, receiving at least one destination container within an area at least partially enclosed by the at least partially circular arrangement of the plurality of bins, moving the end effector of the programmable motion device toward the at least one bin of the plurality of bins, grasping an object from the at least one bin using the end effector, moving the object with the end effector toward the at least one destination container, and placing the object in the at least one destination container with the end effector.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a storage, retrieval and processing system that includes a plurality of bins, where each bin includes objects to be distributed by the system. The plurality of bins are provided in at least a partially generally circular arrangement. The programmable motion device includes an end effector for grasping and moving any of the objects, and the programmable motion device is capable of reaching any of the objects within the plurality of bins. The storage and retrieval system also provides a plurality of destination containers for receiving any of the objects from the plurality of bins, and the plurality of destination containers are provided in a region that is generally within the at least partially generally circular arrangement of the plurality of bins.

In accordance with certain embodiments, the invention automates the picking and the storage and retrieval operations. The system provides an automated storage and retrieval system that instead of picking and moving entire totes out of storage, is able to pick only the required number of individual items out of storage. In some embodiments, the system works by having a robot coupled to a movable platform that is able to go to storage bins and drawers, and to use a programmable motion device (e.g., a robot) to recognize and separate individual items in those drawers so that it may automatically pick desired individual items out of the bins or drawers.

In certain embodiments, the system further works by optionally having the robot carry with it a number of destination bins, so that those items need not be re-sorted later. Instead they are carried in a number of separate bins so that they may remain separated and not mixed up with other retrieved items.

Further, the system has, in certain embodiments, a range of applications including the ability to replenish retail stores with stock as is done in many distribution centers (DCs) today. In this break-pack process, items sold at stores are replenished by distribution centers, and systems of the invention in a DC enables the picking of those items needed to be picked from stores so as to replenish stores. The system therefore reduces the amount of labor required to do this compared with other systems.

Figure 1:
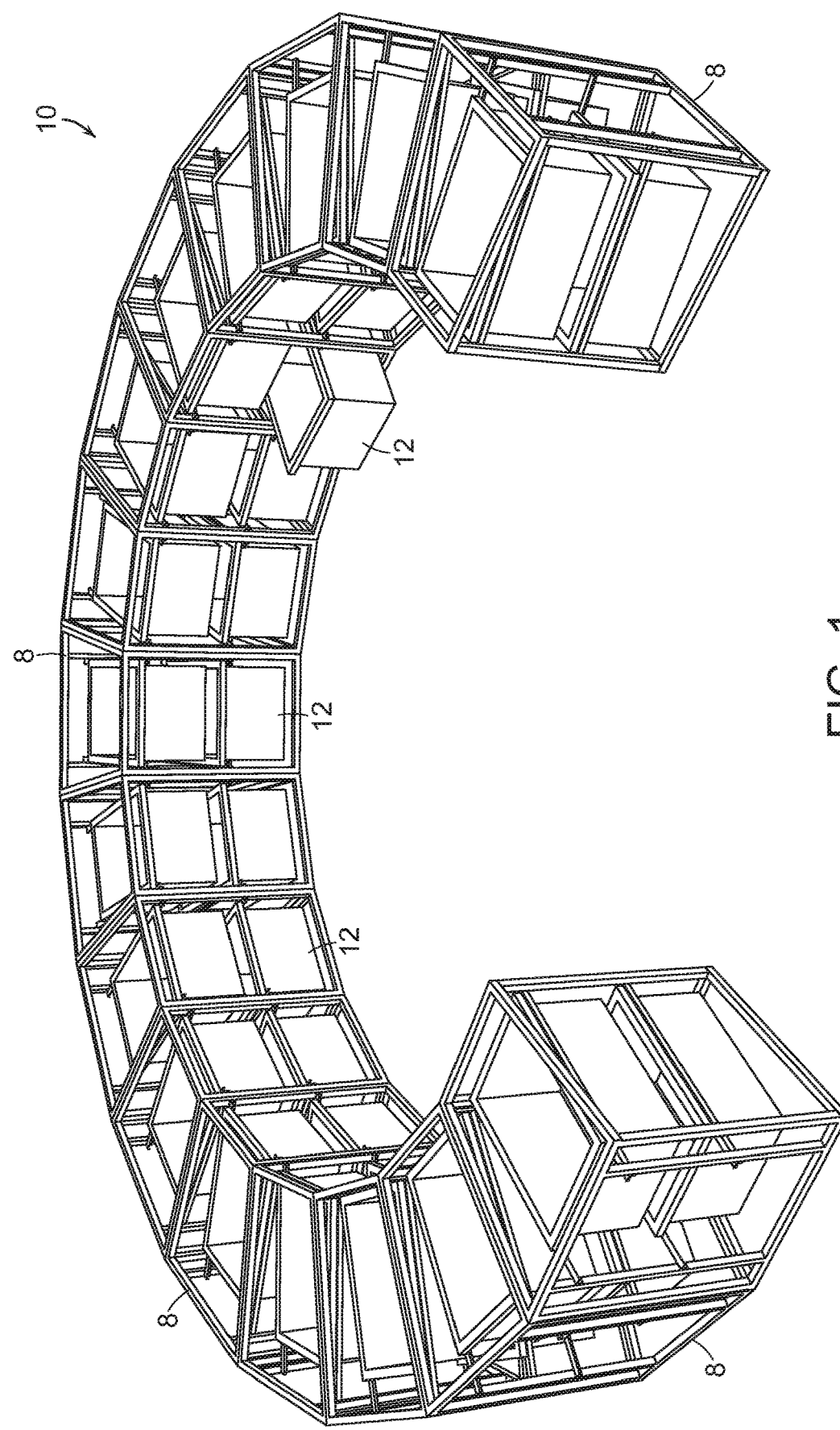
FIG. 1 shows an illustrative diagrammatic view of a storage, retrieval and processing system of an embodiment of the present invention that includes an array of bins in an at least partially circular arrangement.
Figure 2:
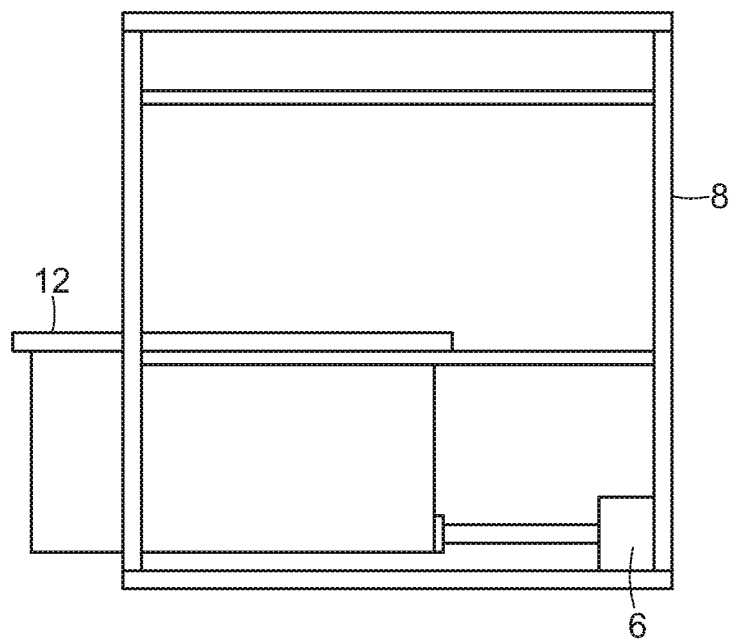
FIG. 2 shows an illustrative diagrammatic view of a drawer containing a bin for use in a system of FIG. 1.

With reference to FIG. 1, the system includes a set 10 of a plurality of bins 12 that are provided in at least a partially generally circular arrangement. Each of the bins 12 may be open or may be provided as a drawer within a cabinet 8. With reference to FIG. 2, when the bins 12 are provided as drawers, the drawers may be automatically actuatable by a drive mechanism 6 (such as a bidirectional solenoid actuator) to move the drawer out of and into the cabinet 8. Each of the bins 12 faces into the center of the generally semicircular arrangement. In accordance with certain embodiments, the bins may be originally filled with objects to be processed, which may for example, be homogenous sets of objects to be retrieved and delivered to destinations to fulfill orders. The bins 12 may be provided by manufacturers, or may be filled by human personnel. In further embodiments, the bins may be filled by other programmable motion devices, and may be provided to the set 10 via automatically controlled carriers as discussed further below.

Figure 3:
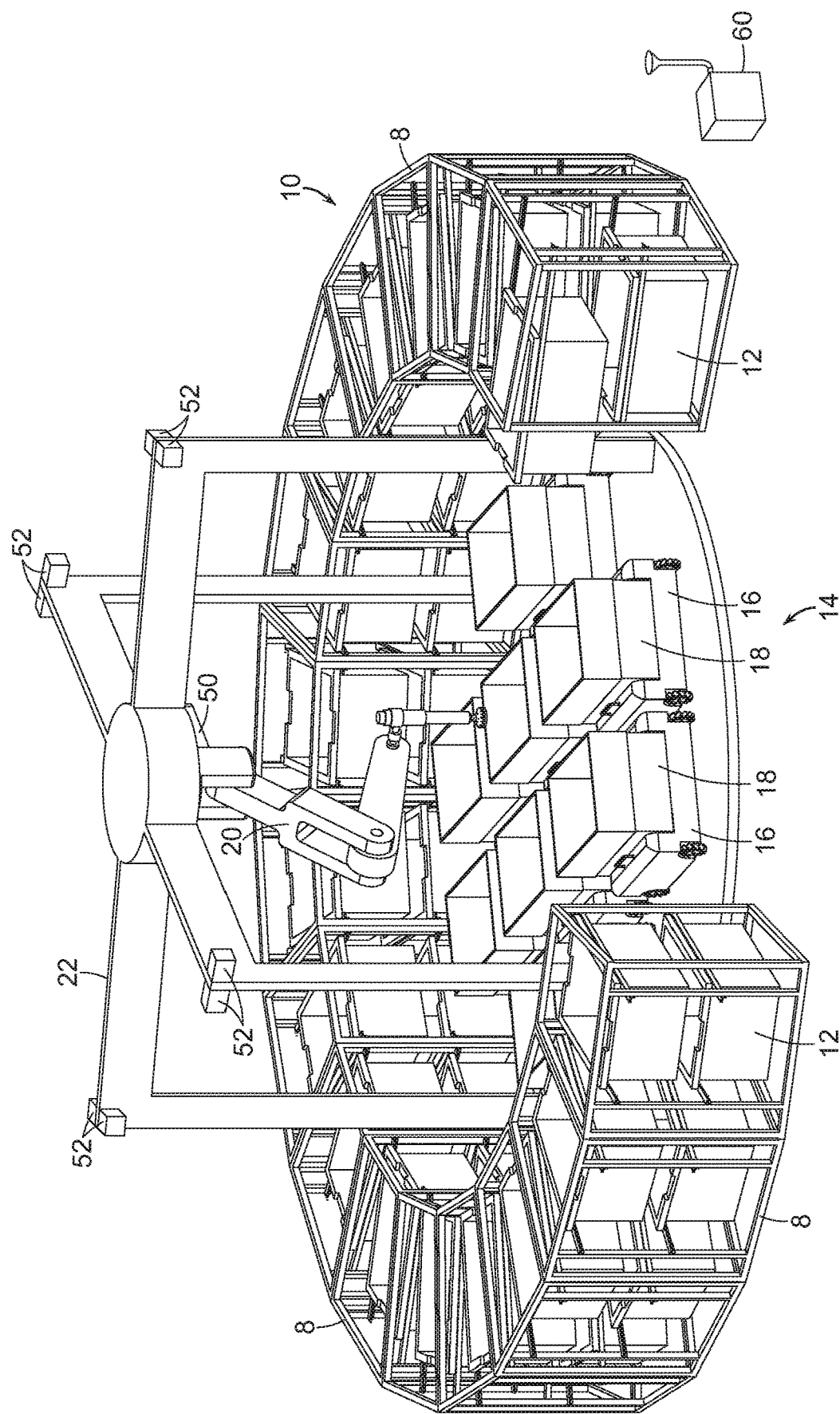
FIG. 3 shows an illustrative diagrammatic view of a storage, retrieval and processing system of an embodiment of the present invention that includes an array of bins in an at least partially circular arrangement as well as a programmable motion device and a plurality of destination locations.

With reference to FIG. 3, the set 10 (or layer) of a plurality of bins, may include an opening 14 through which automated carriers 16 may be provided that each carry a destination bin 18. An articulated arm 20 is also provided that is suspended from a support structure 22. The underside of the support structure also includes a perception system 50. The articulated arm 20 includes an end effector that is able to reach into each of the plurality of bins 12, grasp objects within each of the bins, and move objects to any of the destination containers 18. As noted, the bins 12 may be provided as drawers, in which case either the articulated arm may be programmed with the functionality to open the drawers, or in certain embodiments, the drawers may be automated as discussed above such that the one or more drawers that need to be opened (as they need to be opened), may be automatically opened and then closed after an object is grasped from the bin. Also noted above, the bins 12 may originally be filled by providing the full bins 12 to the system via automated carriers, and the articulated arm may be employed to lift the full bins 12 into the sets 10. The automated carriers may also be provided with position detection means, or may be provided on a track system that includes sensors that scan markings on the carriers to know where each carrier is at all times as discussed further below.

Figure 4:
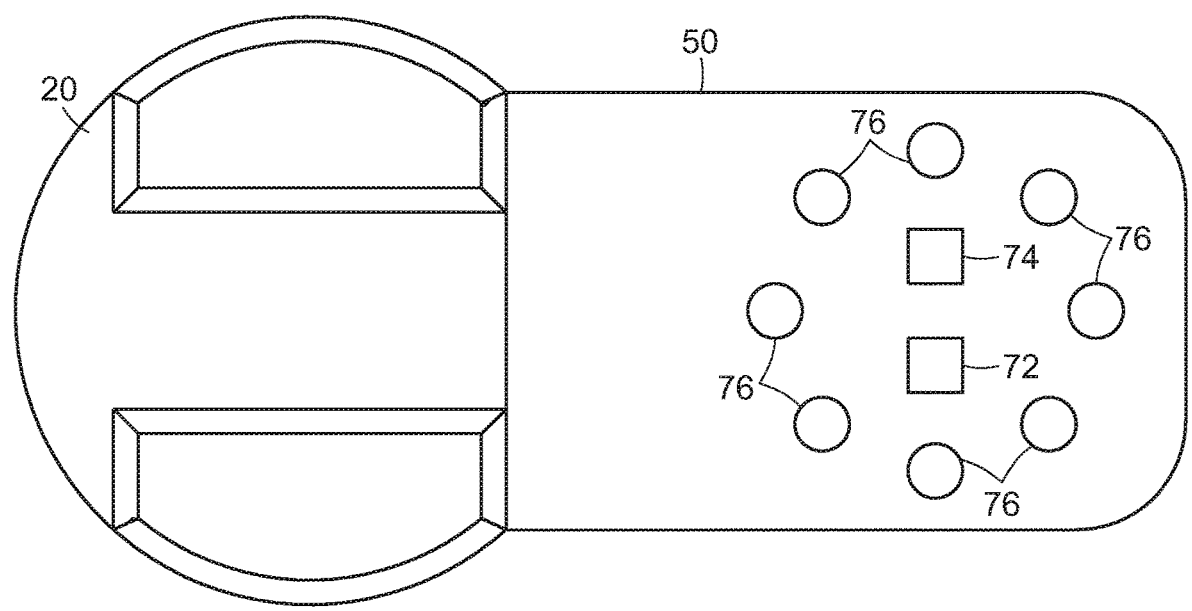
FIG. 4 shows an illustrative diagrammatic view of a perception system for use in a storage, retrieval and processing system of an embodiment of the present invention.

The perception system 50 is mounted above the bins of objects to be processed next to the base of the articulated arm 20, looking down. In the event that the perception system 50 is unable to sufficiently see into the bins 12 when open, the system may employ additional perception systems 52 mounted to the support structure 22, at least one of which may provide a better view of any objects in a bin 12. The perception system 50, for example and as shown in FIG. 4, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 5:
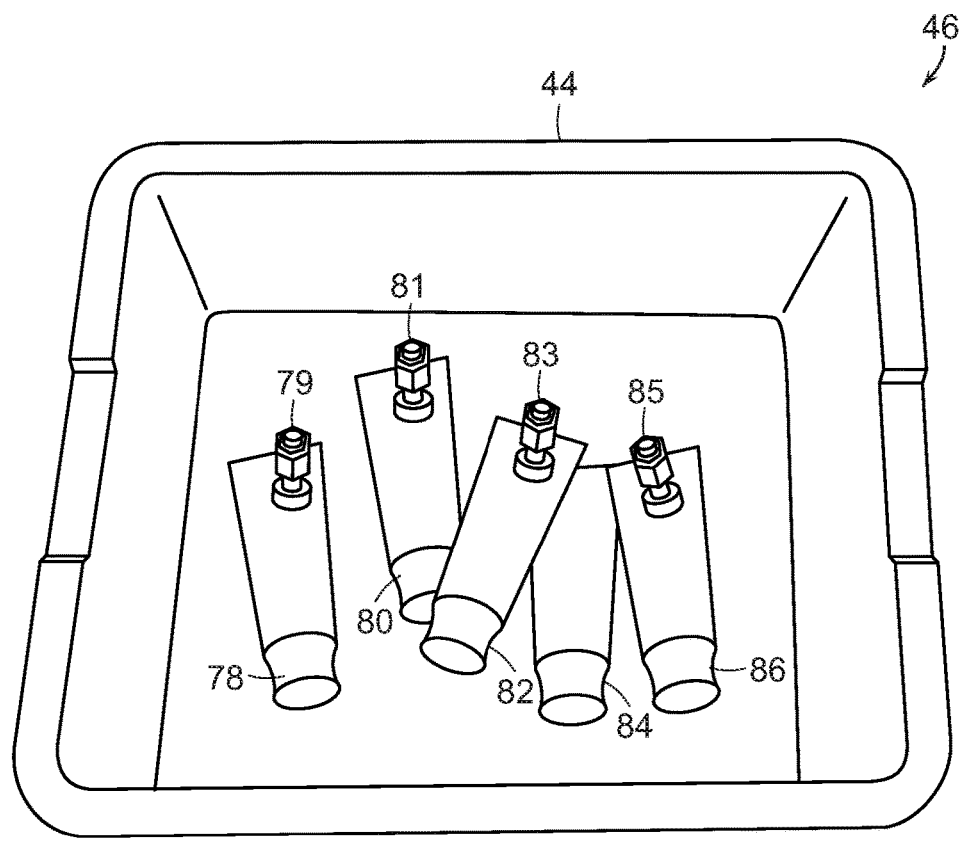
FIG. 5 shows an illustrative diagrammatic view from the perception system of FIG. 4, showing a view of objects within a bin of objects to be processed.

FIG. 5 shows an image view from the perception unit 50. The image view shows a bin 44 in an input area 46, and the bin 44 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 5. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 6A:
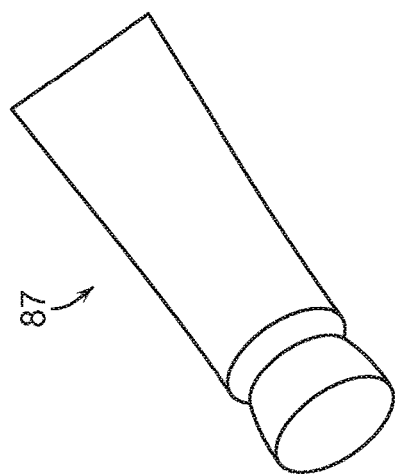
FIGS. 6A and 6B show an illustrative diagrammatic view of a grasp selection process in a storage, retrieval and processing system of the an embodiment of the present invention.
Figure 6B:
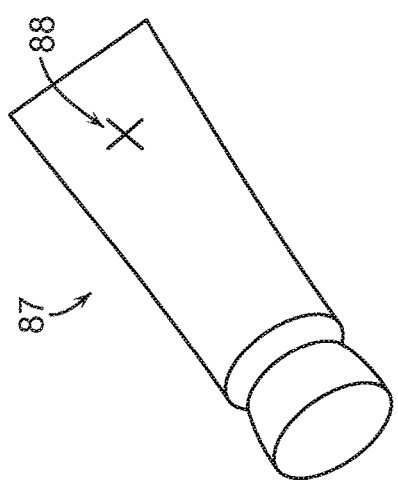

As shown in FIGS. 6A and 6B, the perception system may also identify portions of an object that are the most flat in the generation of good grasp location information. In particular, if an object includes a tubular end and a flat end such as object 87, the system would identify the more flat end as shown at 88 in FIG. 6B. Additionally, the system may select the area of an object where a UPC code appears, as such codes are often printed on a relatively flat portion of the object to facilitate scanning of the barcode.

Figure 8A:
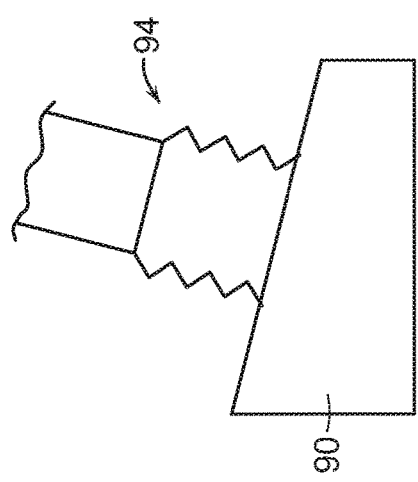
FIGS. 8A and 8B show an illustrative diagrammatic view of a grasp execution process in a storage, retrieval and processing system of the an embodiment of the present invention.
Figure 8B:
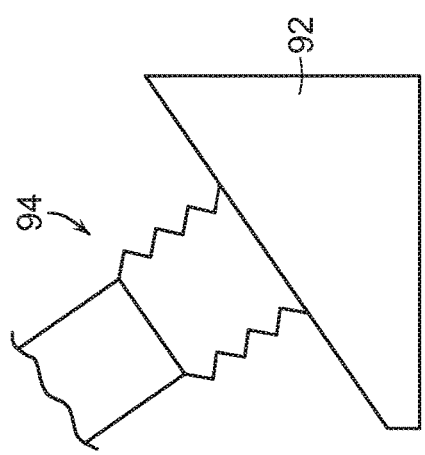
Figure 7A:
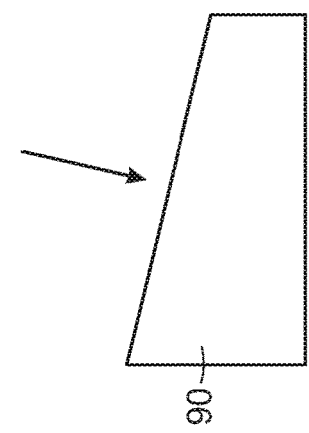
FIGS. 7A and 7B show an illustrative diagrammatic view of a grasp planning process in a storage, retrieval and processing system of the an embodiment of the present invention.
Figure 7B:
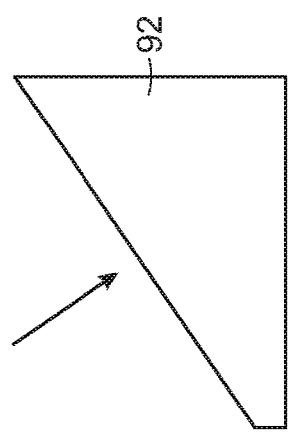

FIGS. 7A and 7B show that for each object 90, 92, the grasp selection system may determine a direction that is normal to the selected flat portion of the object 90, 92. As shown in FIGS. 8A and 8B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

Figure 9:
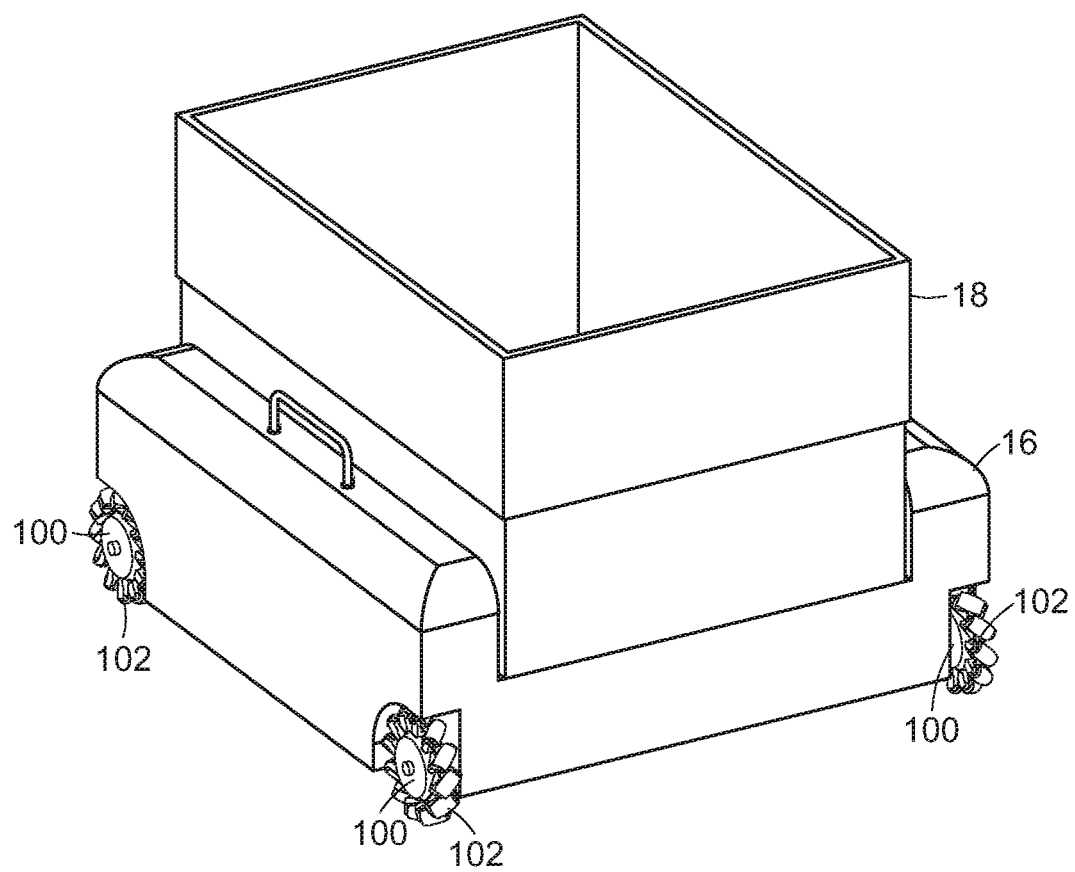
FIG. 9 shows an illustrative diagrammatic view of an automated carrier together with a destination container being carried by the carrier in a storage, retrieval and processing system of the an embodiment of the present invention.
Figure 10:
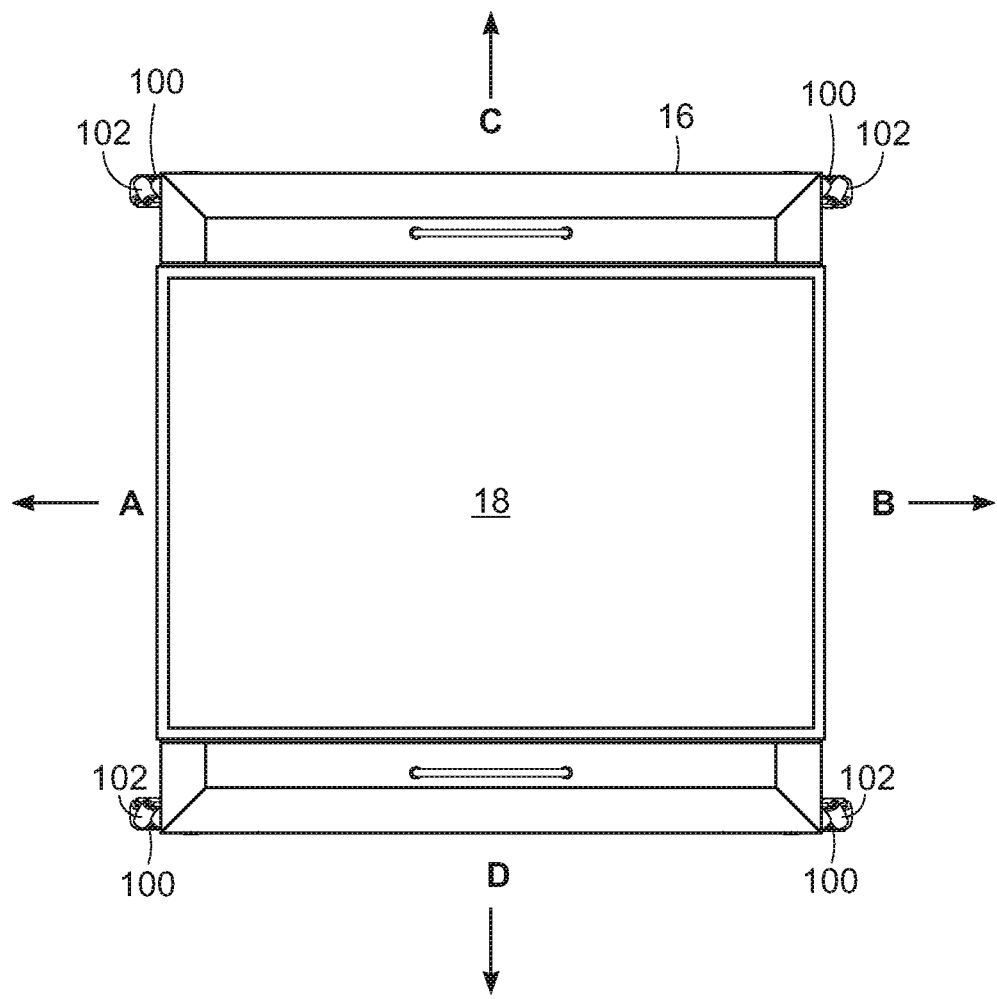
FIG. 10 shows an illustrative diagrammatic top view of the carrier and destination container shown in FIG. 9.

With reference to FIGS. 9, and 10, each of the automated carriers may include set of controllable omnidirectional wheels 100, such as the Mecanum wheels sold by Mecanum AB of Sweden. Each wheels 100 is generally a conventional wheel with a series of controllable rollers 102 attached to the circumference of each wheel. While the wheels 100 provide movement in directions as shown at A and B in FIG. 10, actuation of the rollers 102 (e.g., with limited controlled actuation of the wheels 100) provide movement in directions as shown at C and D in FIG. 10.

Figure 11:
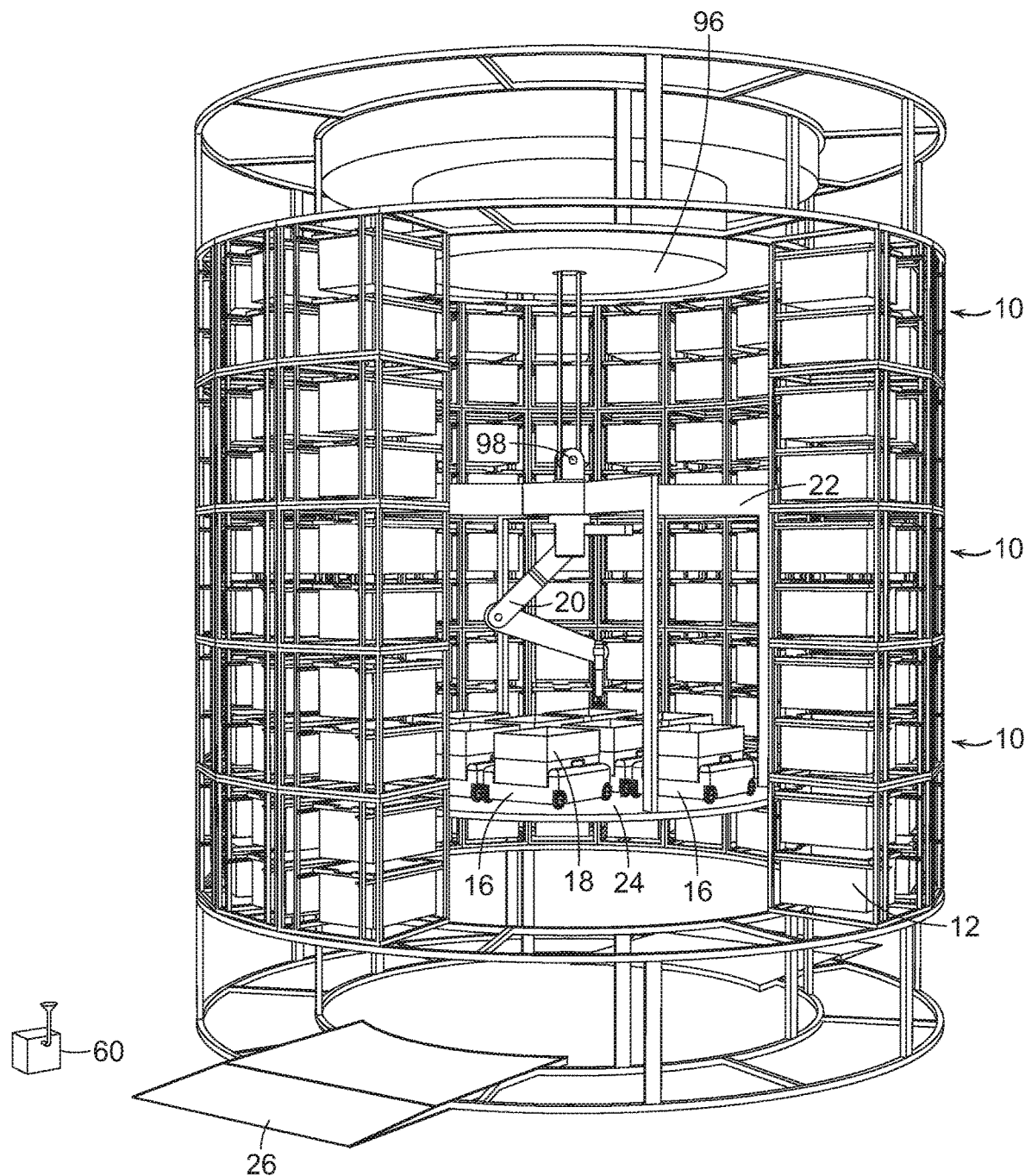
FIG. 11 shows an illustrative diagrammatic view of a storage, retrieval and processing system of an embodiment of the present invention that includes a plurality of levels of arrays of bins in an at least partially circular arrangement.
Figure 12:
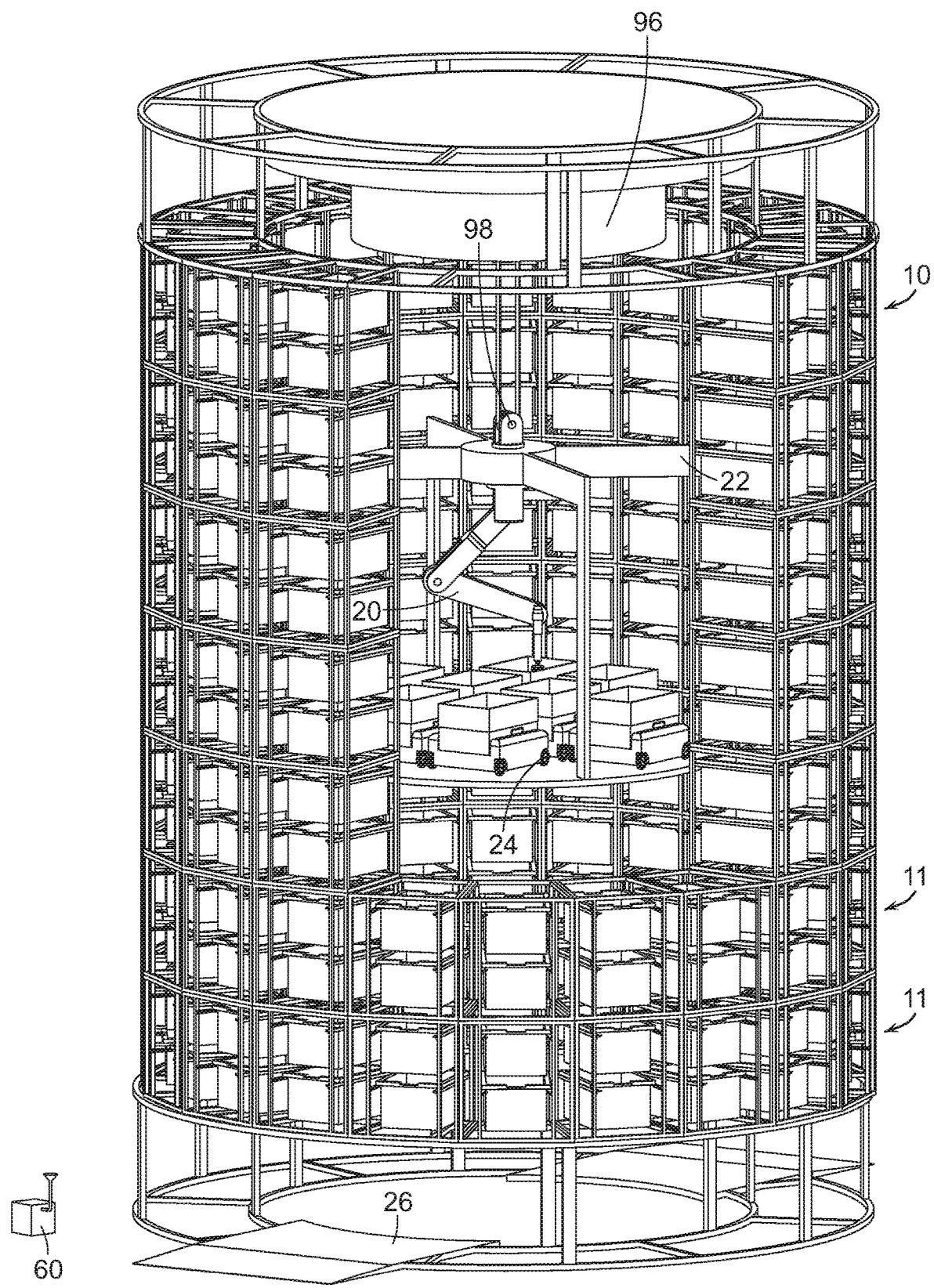
FIG. 12 shows an illustrative diagrammatic view of a storage, retrieval and processing system of another embodiment of the present invention that includes a plurality of levels of arrays of bins in an at least partially circular arrangement, wherein at least some of the levels are fully circular.

With reference to FIGS. 11 and 12, in accordance with further embodiments, the system may include multiple layers of sets 10 of bin 12 stacked upon one another. The systems employ a support structure 22 that supports an articulated arm 20, as well as a platform 24 on which carriers 16 and containers 18 are provided. The systems also include a lift/lowering mechanism 96 that lifts or lowers the structure 22 by means of a pulley 98 such that all layers of sets of bins may be accessed. The movable platform 24 provides a floor that moves with the platform 24, and the destination containers 18 may be provided on the movable floor so that they may be accessed as the articulated arm 20 is moved up and down with to access the different layers 10 of sets of bins. One or more ramps 26 may also be provided that facilitate the automated carriers 16 accessing the interior of the system.

In certain embodiments that provide the bins 12 as actuatable drawers, as the platform is raised to a level, the system (knowing which drawers will need to be accessed at that level) will cause the selected drawers to automatically open when the platform reaches each respective layer. The system will also know which destination bin is carried by each carrier, and will know where each carrier is located at all times. A central processor (e.g., located within the support structure 22 or at a physically separate location) 60, may communicate with the articulated arm 20 including the end effector, will communicate with each actuator 6, and communicate with each of the automated carriers 16. As shown in FIG. 2, certain (e.g., some or all) of the layers of bins may be fully circular as shown at 11.

In accordance with a further embodiment, the invention provides a further processing system for processing objects that includes a plurality levels of a plurality of bins including objects to be distributed by the processing system, the plurality of bins being provided in at least a partially generally circular arrangement. The processing system also includes a programmable motion device that includes an end effector for grasping and moving any of the objects, and the programmable motion device is capable of reaching any of the objects within the plurality of levels of the plurality of bins. The processing system further includes at least one destination container for receiving any of the objects from the plurality of levels of the plurality of bins, the at least one destination containers being provided in a region that is generally within the at least partially generally circular arrangement of the plurality of bins of a level of the plurality of bins.

Figure 13:
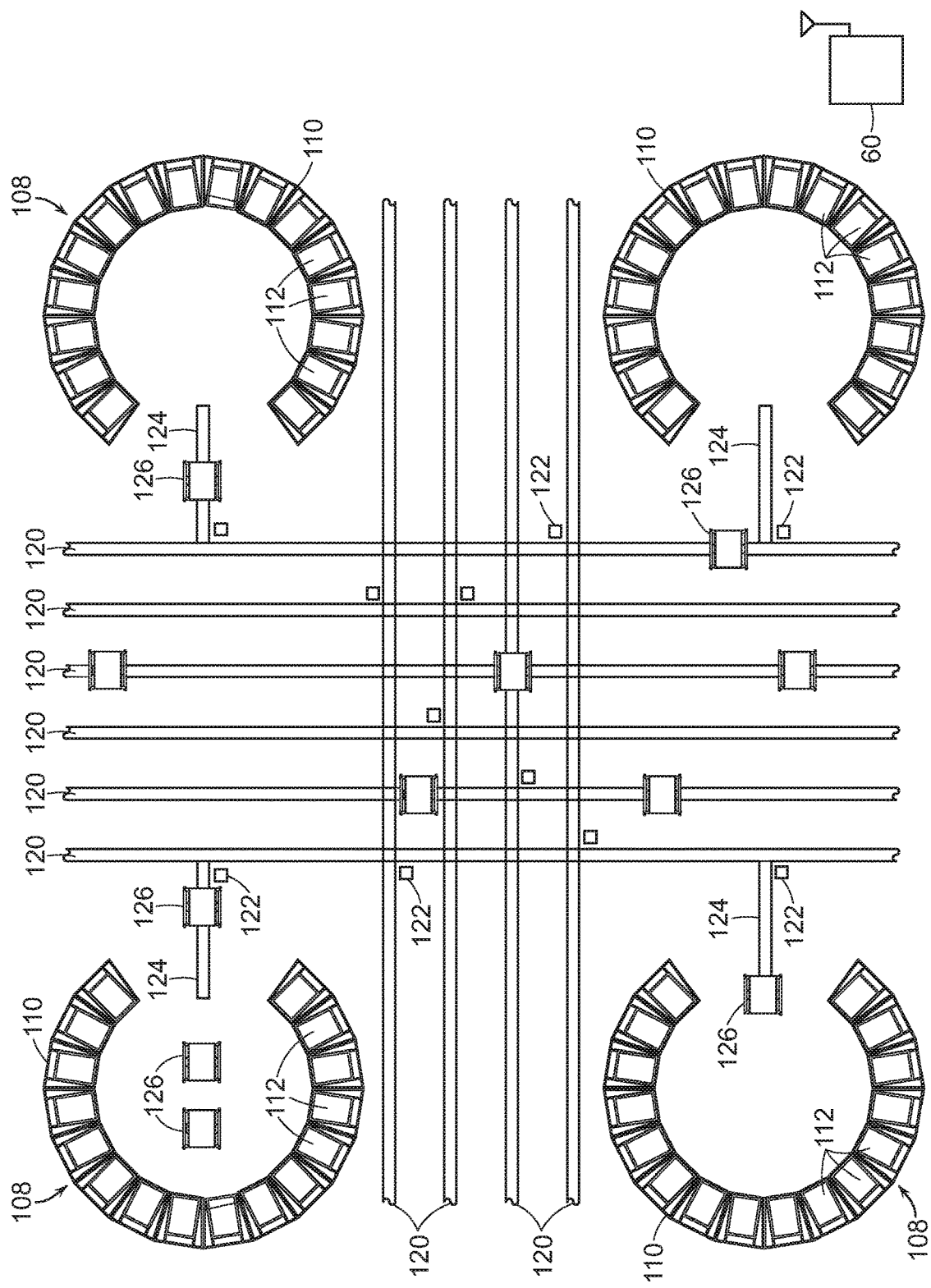
FIG. 13 shows an illustrative diagrammatic plan view of a storage, retrieval and processing system of another embodiment of the present invention that includes a continuous track system by that may be used by carriers for moving destination containers.

FIG. 13 shows (in a plan view) a system in accordance with a further embodiment of the present invention that includes a plurality of stacks 108 of sets 110 of bins 112 similar to sets 10 of bins 12 of FIGS. 1, 2, 11 and 12. Between the stacks 108 of sets of bins, run tracks 120 on which actuatable carriers 126 may run, as well as a plurality of scanners 122 for scanning identifying indicia on the bottoms of the carriers 126 to maintain/confirm knowledge of where each carrier is located on the tracks. Conversely, the tracks may include indicia at 122, and sensors on the carrier may detect the indicia as they move over the indicia on the track. The tracks 120 may also include on/off runs 124 to facilitate the carriers accessing the stacks 108.

In accordance with an embodiment, for example, the tracks may be provided by paint with a particular reflective characteristic, and sensors on the bottom of the carrier 126 may be programmed to follow the painted track. Further sensors may cause the carrier to change direction when, for example, a sensor or indicia 122 is encountered. The carriers may still be able to run without a track, for example, to and from the stacks 108 without tracks, but the use of the tracks may reduce computation expenses.

Figure 14:
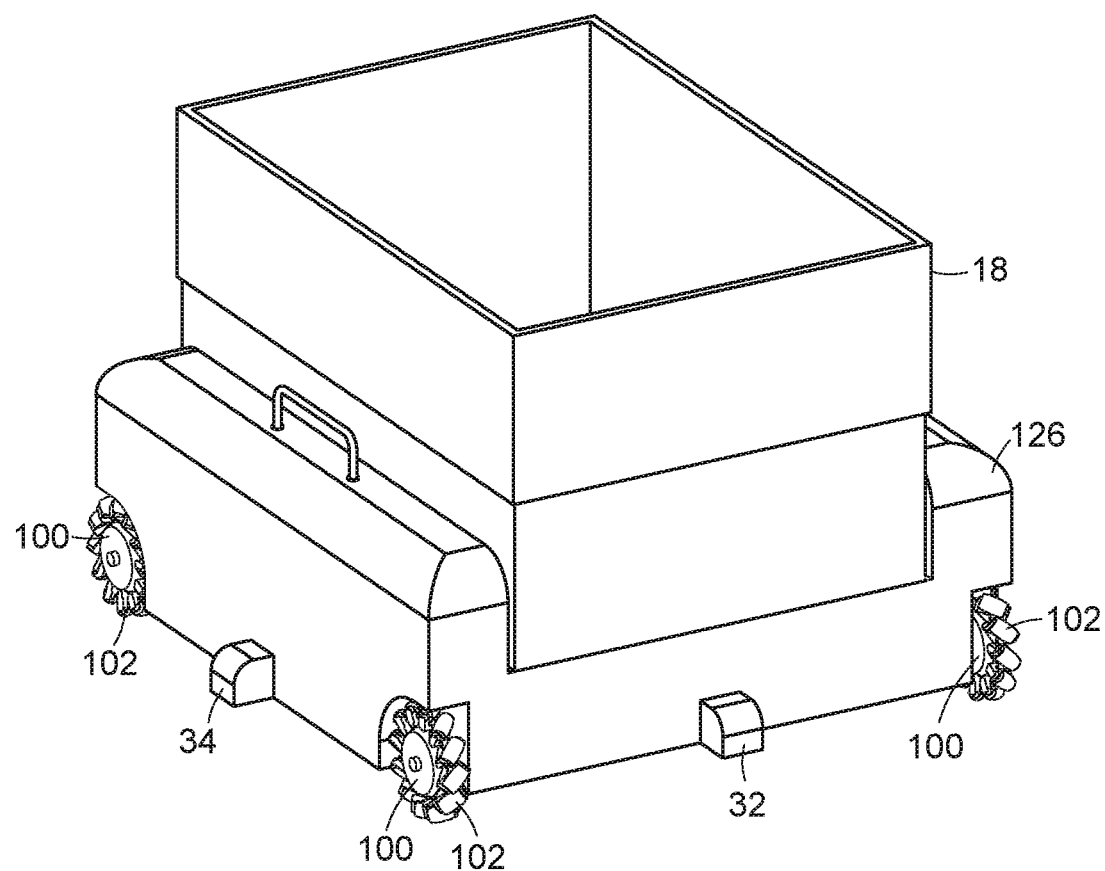
FIG. 14 shows an illustrative diagrammatic view of another automated carrier together with a destination container being carried by the carrier in a storage, retrieval and processing system of the an embodiment of the present invention for use on the continuous track system of FIG. 13.
Figure 15:
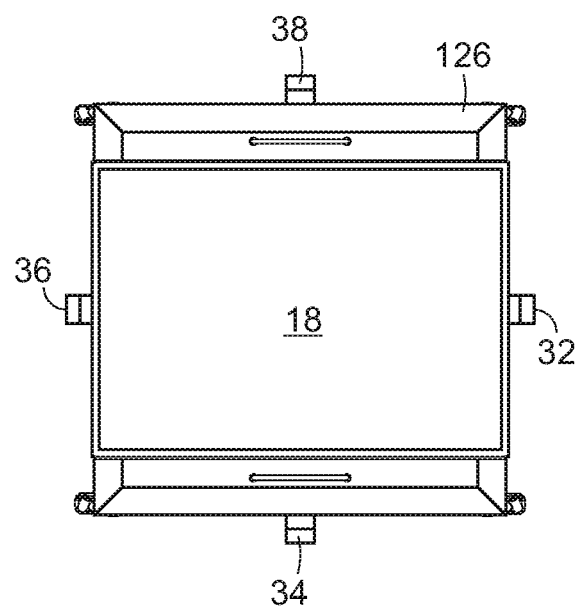
FIG. 15 shows an illustrative diagrammatic top view of the carrier and destination container of FIG. 14.
Figure 16:
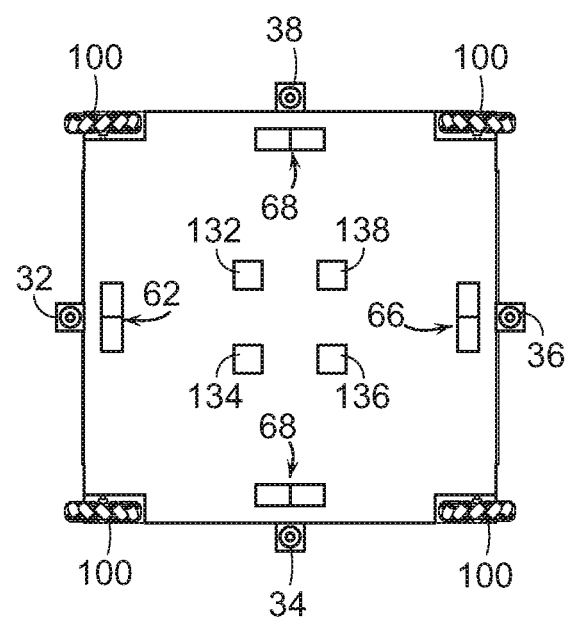
FIG. 16 shows an illustrative diagrammatic bottom view of the carrier for use on the continuous track system of FIG. 14.

For example, FIG. 14 shows such a carrier 126 that includes four illumination sources 32, 34, 36, 38 for illuminating the track below each source. FIG. 15 shows a top view of the carrier 126, showing the position of each of the illumination sources 32, 34, 36, 38. FIG. 16 shows an underside of the carrier 126, which shows four pairs of illumination sensors 62, 64, 66, 68. As the carrier 126 moves over a track section (e.g., a section of track that is under sensor pairs 62, 66), the system monitors the amount of light being received at each pair of underside sensors (e.g., each of pair 62 and each of pair 66) to determine if the amount of illumination being received by each of the pair is generally the same. If much more illumination is received by one of a pair, the system may assume that the carrier has run off course. Having two such pairs (e.g., 62, 66) for a painted track line, provides further robustness to the system. Additionally, sensors (or indicia) 132, 134, 136, 138 may be provided on the underside of each carrier 126 for communicating with any of indicia (or sensors) 122 on the track. This may assist in providing further security in confirming the location of a carrier, and/or in providing turning instructions to a carrier.

Figure 17:
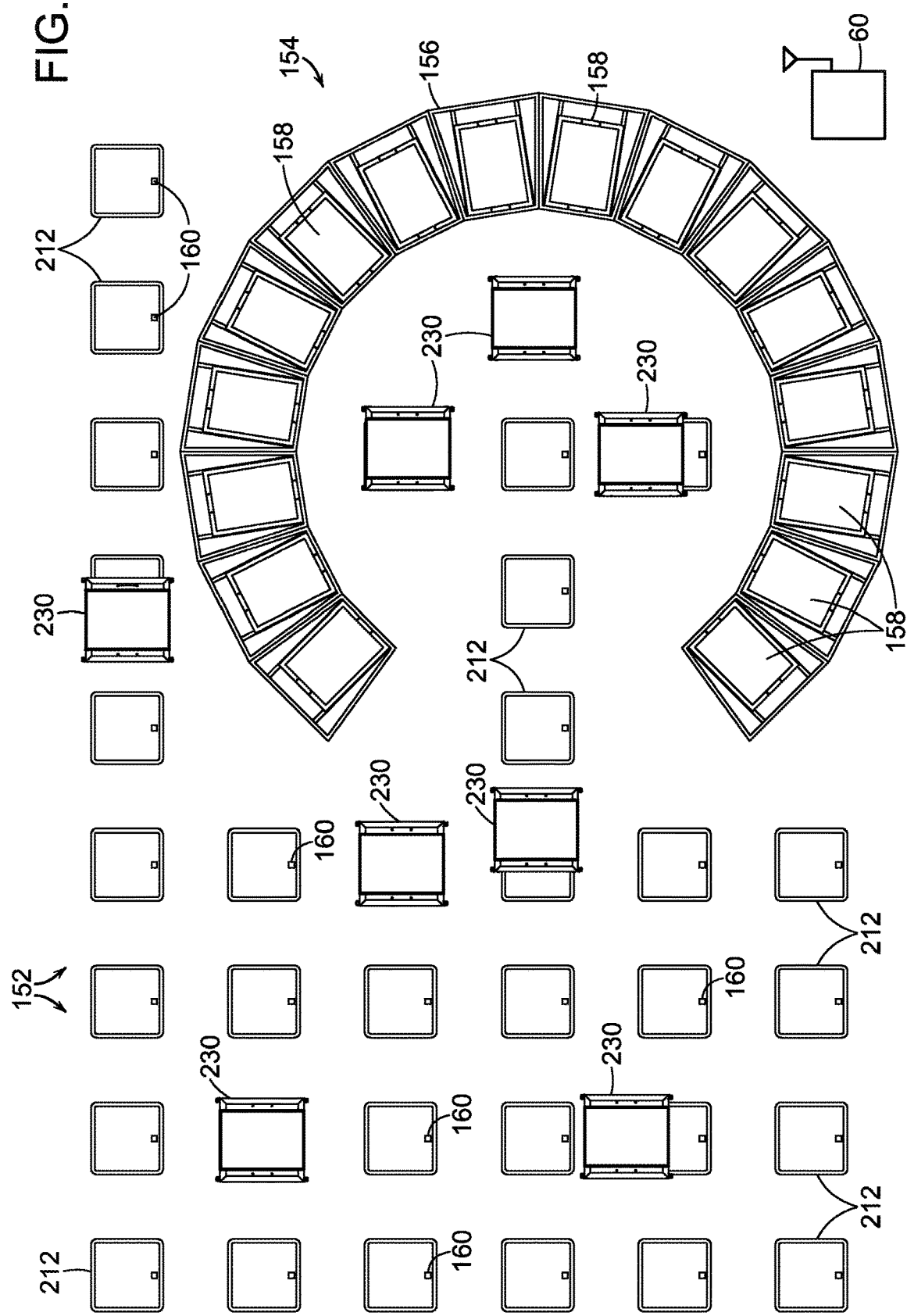
FIG. 17 shows an illustrative diagrammatic plan view of a storage, retrieval and processing system of a further embodiment of the present invention that includes a discontinuous track system by that may be used by carriers for moving destination containers.

FIG. 17 shows (again in a plan view) a system 150 in accordance with a further embodiment of the present invention that includes a discontinuous track system 152 that runs among one or more stacks 154 of sets 156 of bins 158 similar to those discussed above. The discontinuous track system 152 includes a plurality of track sections 212 that may be generally in the shape of squares, and carriers 230 may run along the track sections 212 in each of two mutually orthogonal directions as discussed in more detail below. The track sections may either run into the stacks 154, may run onto a platform of such stacks, or may stop outside of the stack, requiring the carrier 230 to travel without the aid of a track within the stack. The track sections 212 may also include either sensors or indicia 160 inside each track section that may communicate with either indicia or sensors 276 on the underside of each carrier 230 as discussed in more detail below and shown in FIGS. 22A, 22B and 24A, 24B.

Figure 18:
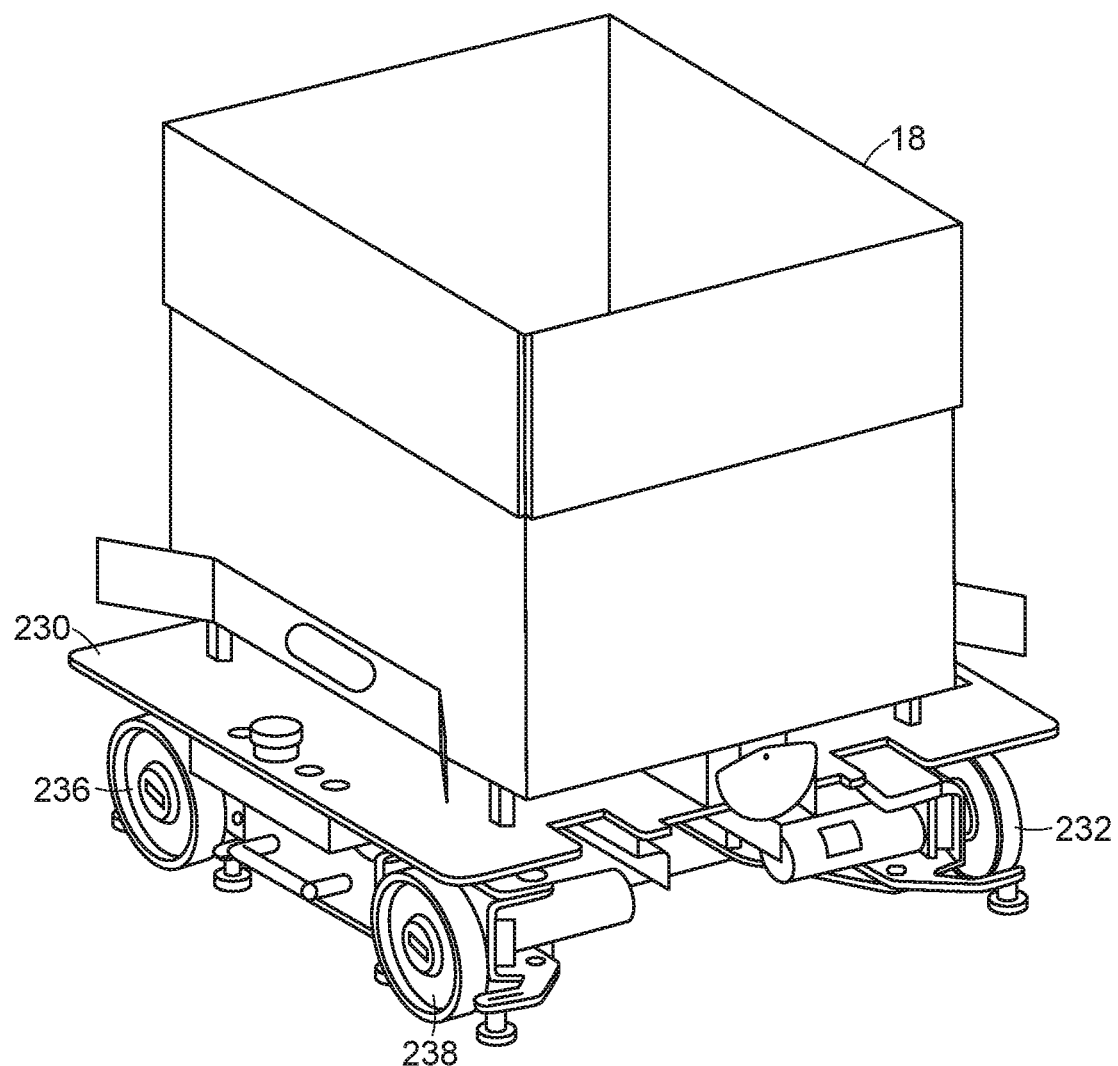
FIG. 18 shows an illustrative diagrammatic view of a further automated carrier together with a destination container being carried by the carrier in a storage, retrieval and processing system of the an embodiment of the present invention for use on the discontinuous track system of FIG. 17.

FIG. 18 shows a carrier 230 together with a destination container 18. The carrier 230 may be moved about the track sections 212 (from FIG. 17) bi-directionally in either of two mutually orthogonal directions. This is achieved by having the four drive wheel assemblies optionally pivot ninety degrees. A plurality of these carriers 230 may be employed on the discontinuous track system 150 at the same time, engaging a plurality of stacks 154.

Figure 19A:
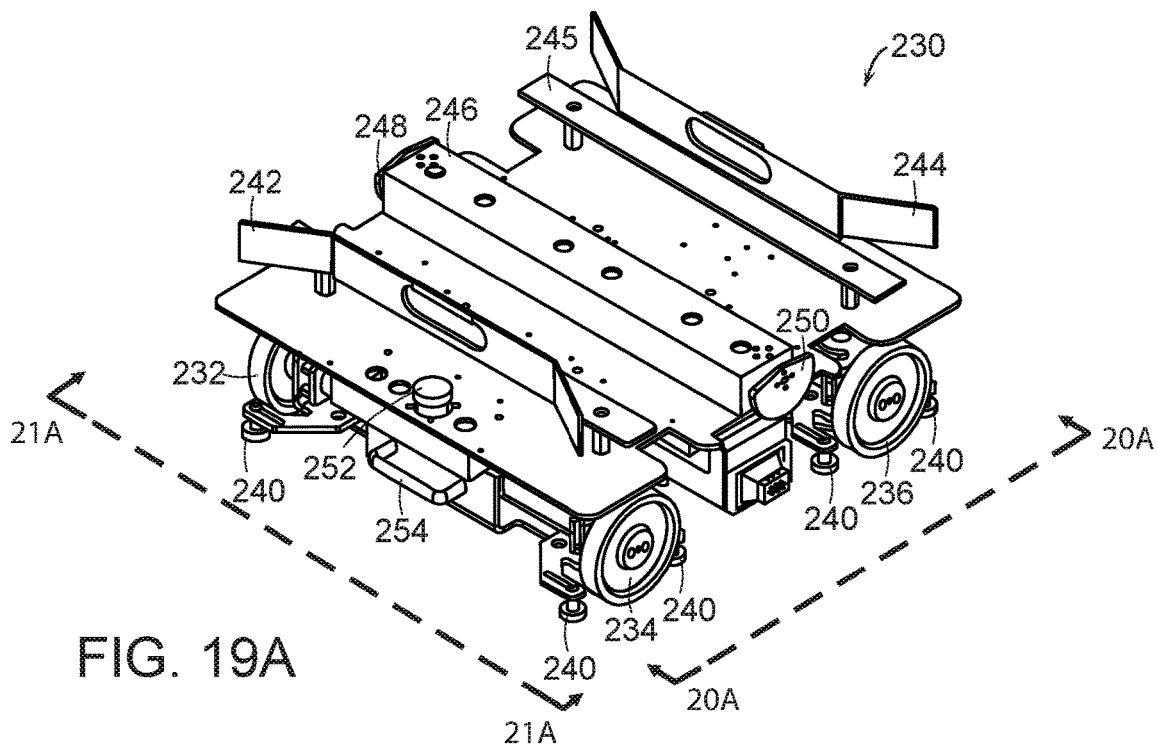
FIGS. 19A and 19B show illustrative diagrammatic isometric views of the carrier of FIG. 18 with the wheel assemblies in each of two different pivotal positions.
Figure 19B:
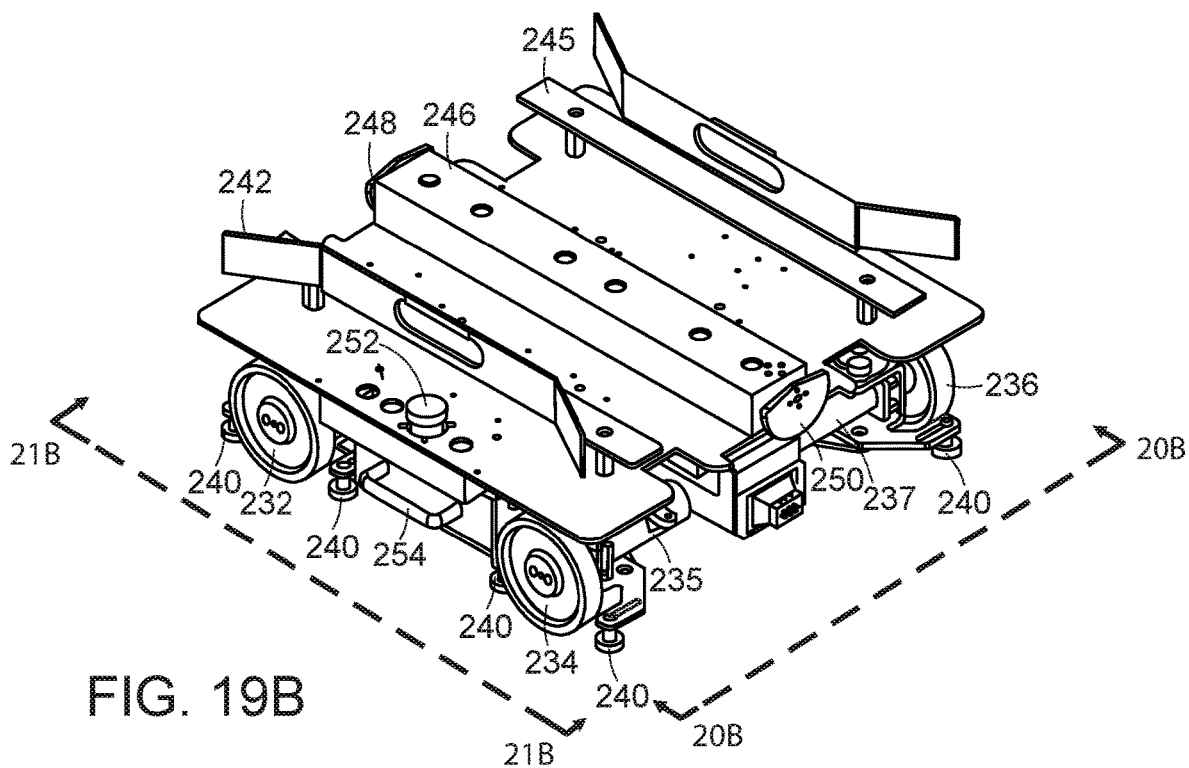
Figure 20A:
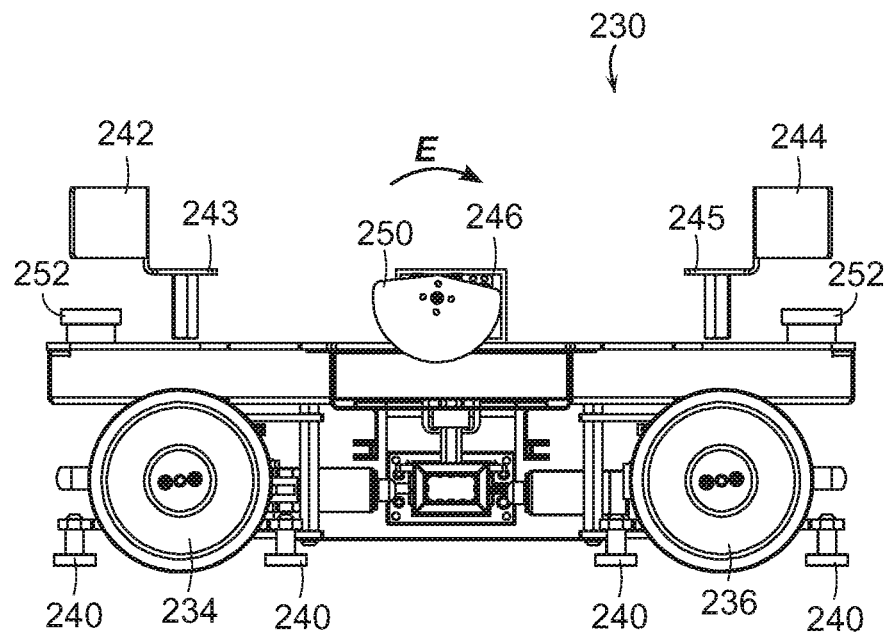
FIGS. 20A and 20B show illustrative diagrammatic side views of the carrier shown in FIGS. 19A and 19B taken along lines 20A-20A and 20B-20B respectively.
Figure 20B:
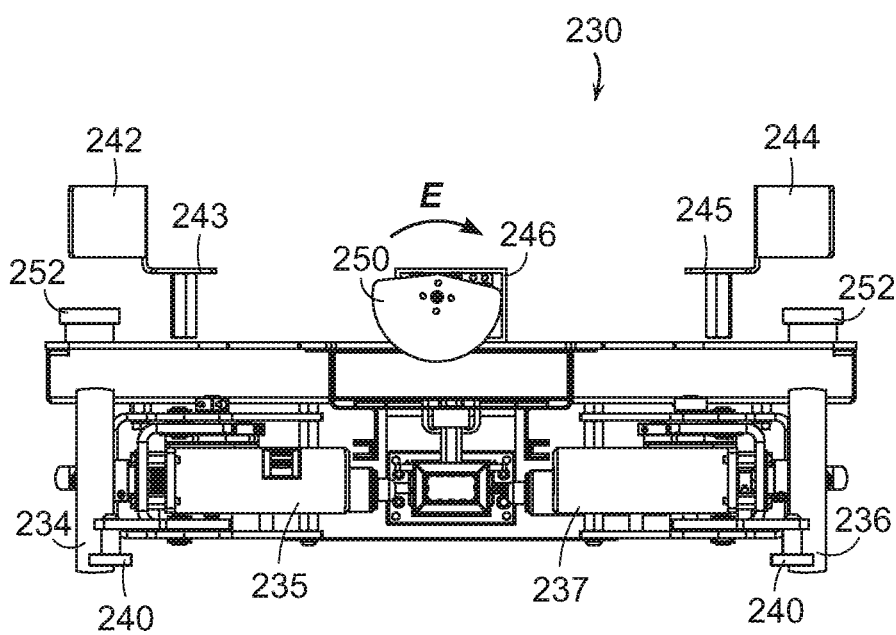
Figure 21A:
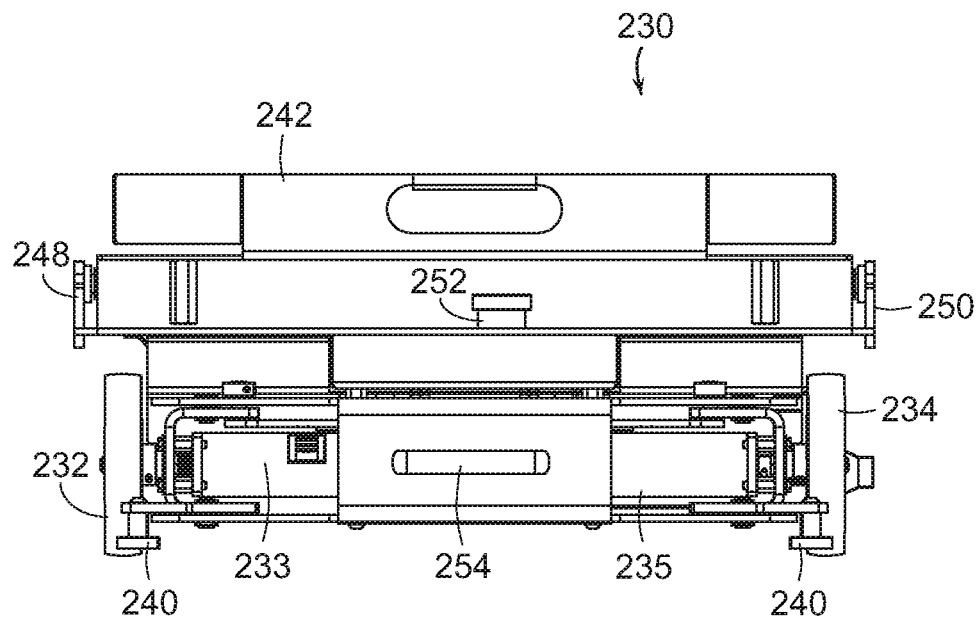
FIGS. 21A and 21B show illustrative diagrammatic end views of the carrier shown in FIGS. 19A and 19B taken along lines 21A-21A and 21B-21B respectively.
Figure 21B:
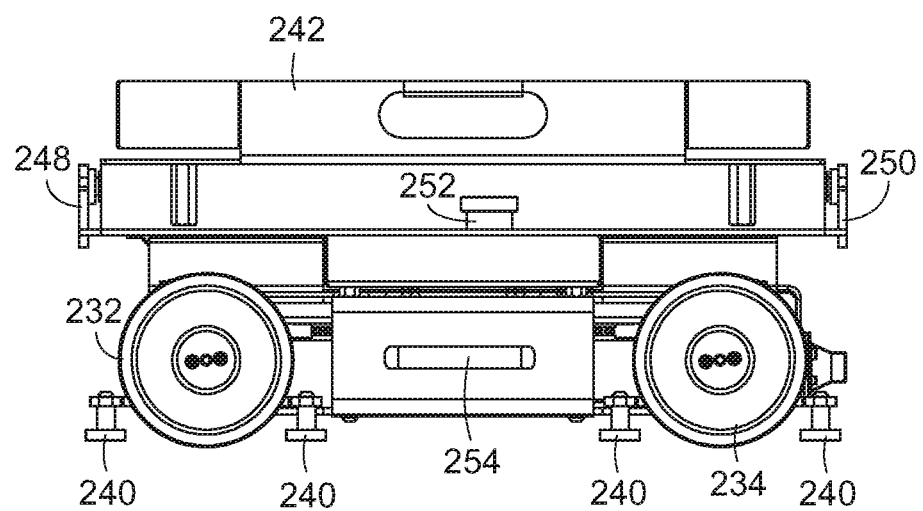
Figure 23B:
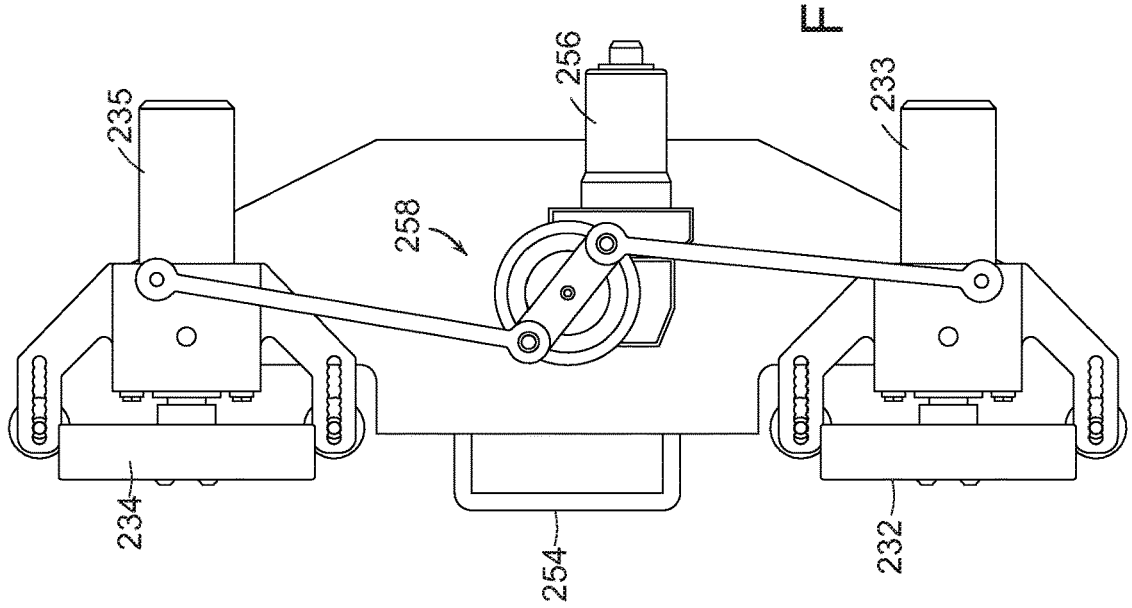
FIGS. 23A and 23B show illustrative diagrammatic views of pivotal wheel assemblies for use in a carrier of an embodiment of the present invention in each of two positions.

In accordance with certain embodiments therefore, the invention provides a plurality of mobile carriers that may include swivel mounted wheels that rotate ninety degrees to cause each mobile carrier to move forward and backward, or to move side to side. When placed on a grid, such mobile carriers may be actuated to move to all points on the grid. FIGS. 19A and 19B, for example, show a mobile carrier 230 that includes wheels 232, 234, 236 and 238 (shown in FIGS. 23A and 23B). Each of the wheels is mounted on a motor 233, 235, 237, 239 (as best shown in FIG. 23B), and the wheel and motor units are pivotally mounted to the carrier 230 as discussed in more detail below. The wheel assemblies (each including a wheel, its motor and track guides 240) are shown in one position in FIG. 19A, and are shown in a second pivoted position in FIG. 19B. FIG. 20A shows an end view of the carrier 30 taken along lines 20A-20A of FIG. 19A, and FIG. 20B shows an end view of the carrier 30 taken along lines 20B-20B of FIG. 19B. Similarly, FIG. 21A shows a side view of the carrier 30 taken along lines 21A-21A of FIG. 19A, and FIG. 21B shows a side view of the carrier 30 taken along lines 21B-21B of FIG. 19B.

Each carrier 230 also includes a pair of opposing rails 242, 244 for retaining a bin, as well as a raised center portion 246 and stands 243, 245 on which a bin may rest. A pair of independently actuated paddles 248, 250 are also provided. Each paddle 248, 250 may be rotated upward (as shown at B in FIG. 20A) to retain a bin on the carrier, or may rotated downward to permit a bin to be moved onto or off of a carrier. The paddles 248, 250 are shown rotated downward in FIGS. 19A-21B.

Note that the orientation of the carrier 230 (also a bin on the carrier) does not change when the carrier changes direction. Again, a bin may be provided on the top side of the carrier, and may be contained by bin rails 242, 244 on the sides, as well actuatable paddles 248, 250. As will be discussed in further detail below, each paddle 248,250 may be rotated 180 degrees to either urge a bin onto or off of a shelf, or (if both are actuated) to retain a bin on the carrier during transport. Each paddle may therefore be used in concert with movement of the carrier to control movement of the bin with respect to the carrier 230. For example, when on paddle is flipped into an upward position, it may be used to urge the bin onto a shelf or rack while the carrier is moving toward the shelf or rack. Each carrier may also include one or more emergency stop switches 252 for a person to use to stop the movement of a carrier in an emergency, as well as handles 254 to enable a person to lift the carrier if needed.

Figure 22A:
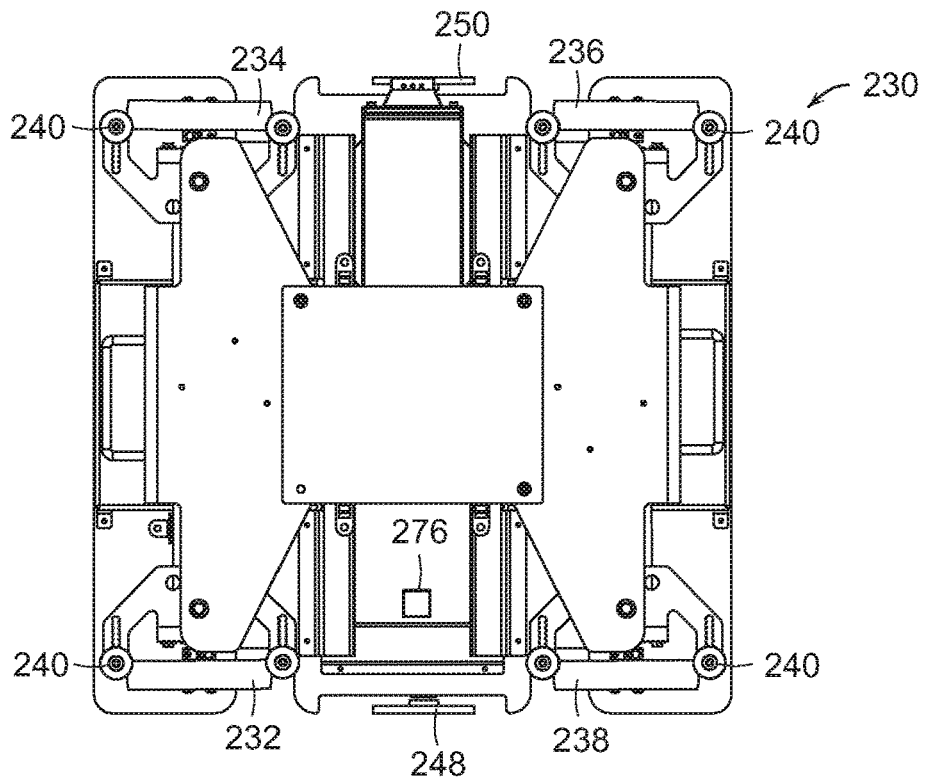
FIGS. 22A and 22B show illustrative diagrammatic bottom views of the carrier shown in FIGS. 19A and 19B respectively.
Figure 22B:
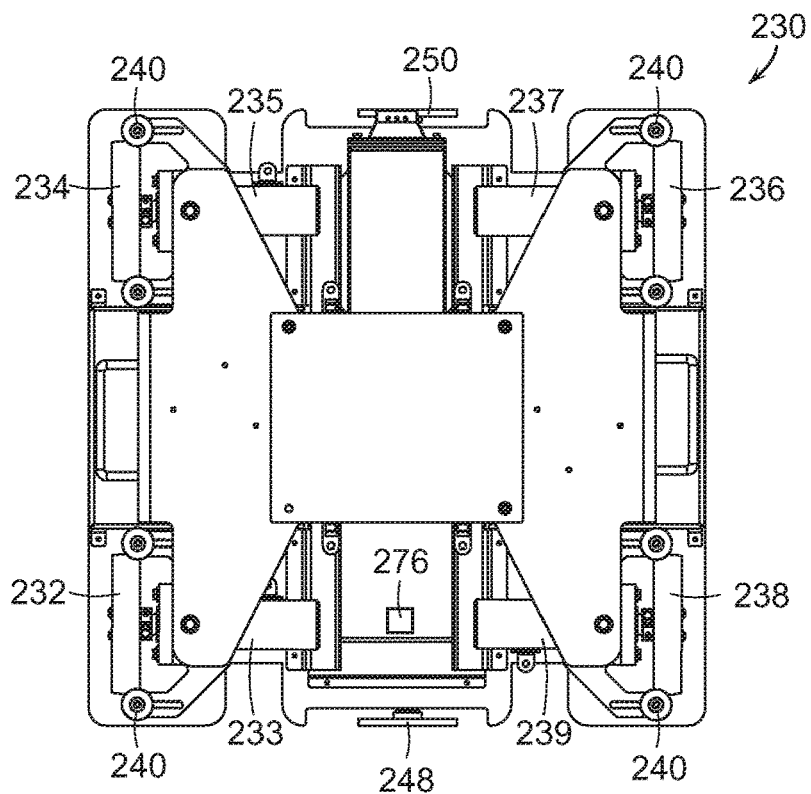
Figure 23A:
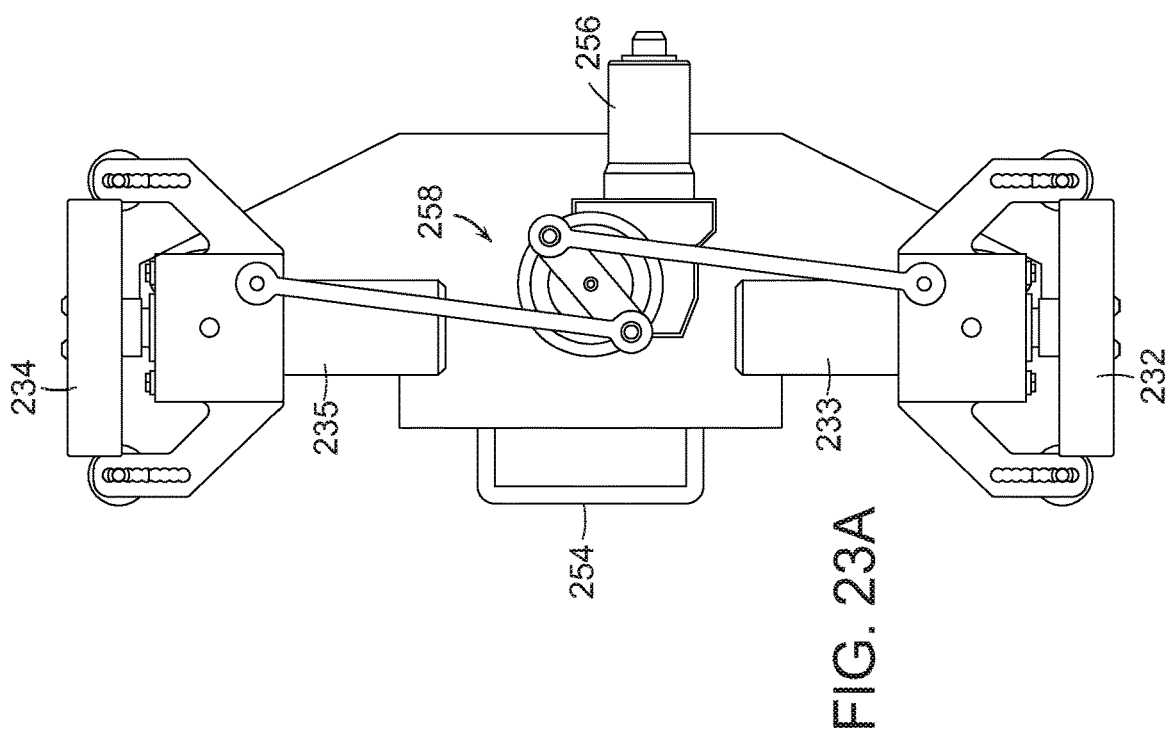
Figure 24A:
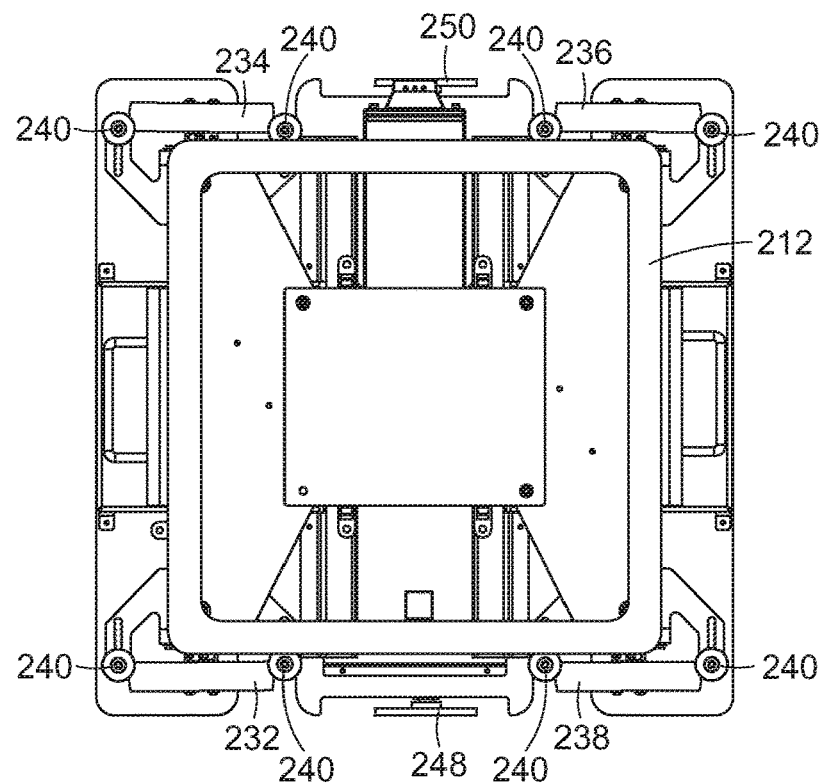
FIGS. 24A and 24B show illustrative diagrammatic bottom views of the carrier shown in FIGS. 19A and 19B respectively with track sections superimposed thereon for illustrative purposes.
Figure 24B:
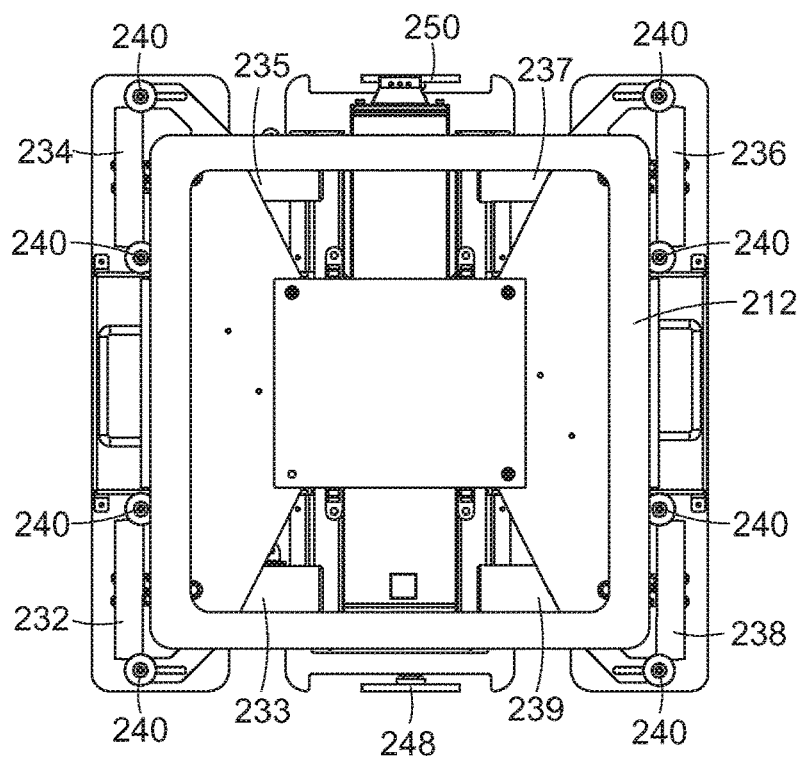

FIG. 22A shows a bottom view of the carrier 230 with the wheels in the position as shown in FIG. 19A, and FIG. 22B shows a bottom view of the carrier 230 with the wheels in the position as shown in FIG. 19B. FIGS. 22A and 22B show all of the wheels 232, 234, 236 and 238, and each of the motors 233, 235, 237 and 238 is also shown in FIG. 22B. As may be seen in FIGS. 22A and 22B, the entire wheel assemblies including the wheel, guide rollers and the wheel motor, each pivot as a unit. With reference to FIGS. 23A and 23B, each pair of wheel assemblies may, in an embodiment, be pivoted by a common pivot motor 256 that is coupled to the wheel assemblies via linkages 258. FIG. 23A shows a pair of wheel assemblies in a position as shown in FIG. 23A, and FIG. 23B shows the pair of wheel assemblies in a position as shown in FIG. 19B. The wheel assemblies are designed to be able to pivot the wheels around corners of a track section when the carrier is directly above a track section. FIGS. 24A and 24B show views similar to the underside views of FIGS. 22A and 22B but with a track section 212 superimposed on the Figures to show the relation of the wheel positions to the track section. Note that the wheels pivot around each of the corners of the track section. When the carrier is centered over the track section, therefore, the wheels may be pivoted such that the carrier may move in a direction that is orthogonal to a prior direction without requiring that the carrier itself be turned. The orientation of the carrier is therefore maintained constant while the carrier is moved about an array of tracks sections.

Figure 25A:
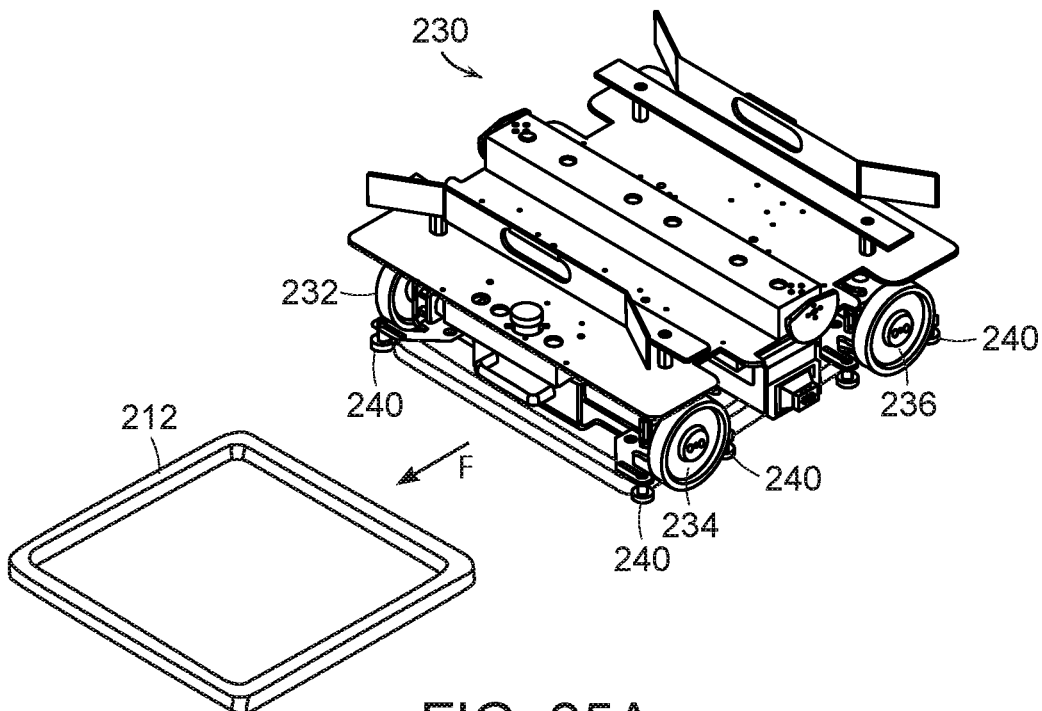
FIGS. 25A-25C show illustrative diagrammatic views of the carrier of FIG. 18 at different stages of engaging an adjacent track section during movement.
Figure 25B:
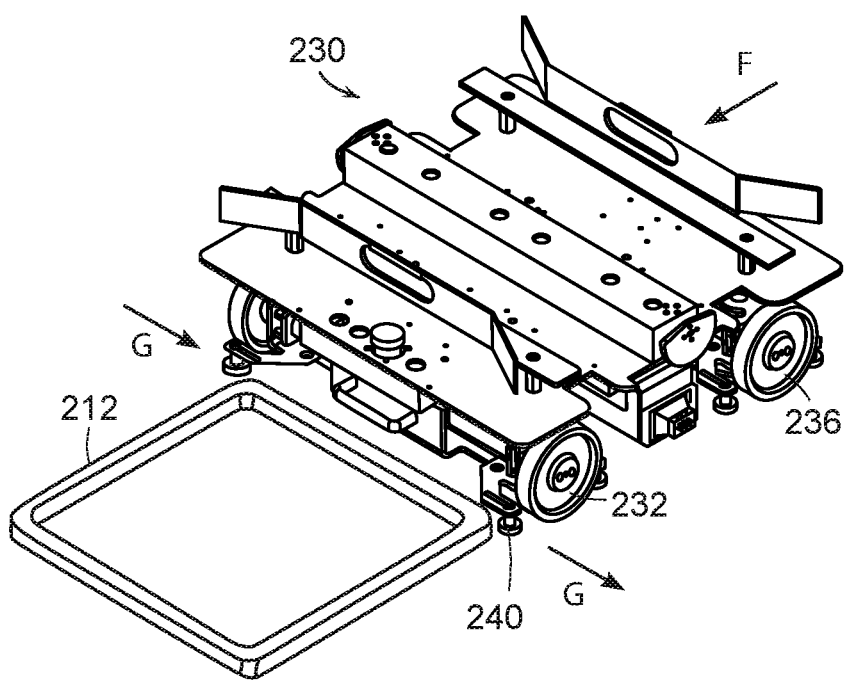

The movement of the carrier 230 about an array of track sections is further discussed below with regard to FIGS. 25A-25C. In short as a carrier leaves one track section, it travels toward an adjacent track section, and if at all misaligned, will realign itself. The realignment of the guide rollers and the tracks may function as follows. While the two sets of wheels (232, 234 and 236, 238) may be designed to move the carrier 230 in a linear direction only, some variations may occur. The tracks 212 are positioned, though intermittently, close enough to each other than when a carrier leaves one track and moves toward another 212 (as shown at B), its potential variation off course will be small enough that the rounded corners of the next adjacent track will urge the carrier back on course. For example, FIG. 25A shows a carrier 230 leaving a track and beginning to approach a next track 212 as the carrier moves in a direction as indicated at B. As shown in FIG. 25B, if the alignment of the carrier 230 is off (possibly from variations in the wheels or the mounting of the wheels, the placement of the track sections or any other variable), one of the rounded corners 260 of next adjacent track 212 will become engaged by an on-coming guide wheel 240, and the rounded corner 260 will cause the carrier 230 to move slightly in a direction (as shown at C) perpendicular to the direction B to correct the direction of movement of the carrier 230. If the misalignment is too far off, the carrier may reverse direction and try to become again aligned, or may stop moving and be recovered. If a carrier does stop moving, the directions of movement of the other carriers are programmed to avoid the area of the stopped carrier until it is removed. If an area results in a number of stopped carriers over time, the alignment of the track(s) in the area may be examined and/or replaced.

Figure 25C:
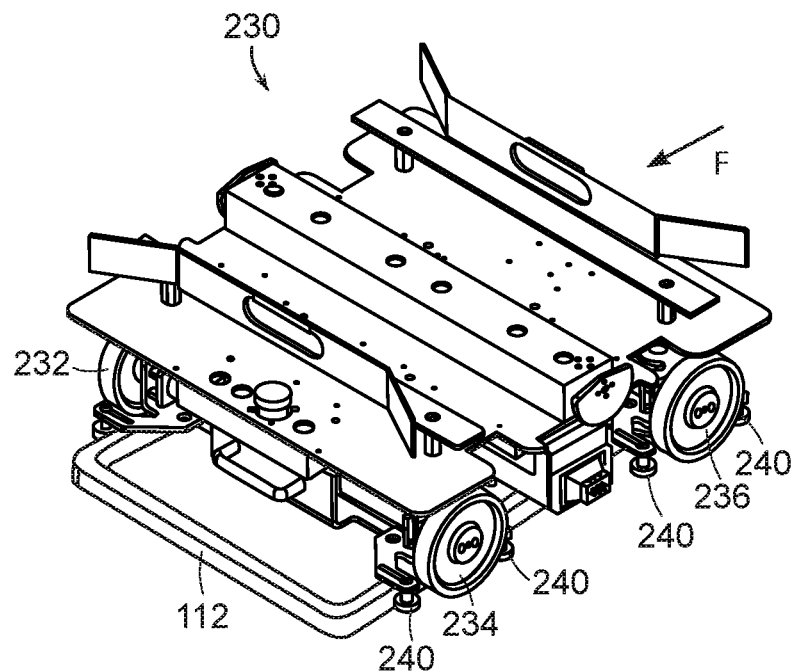
Figure 26:
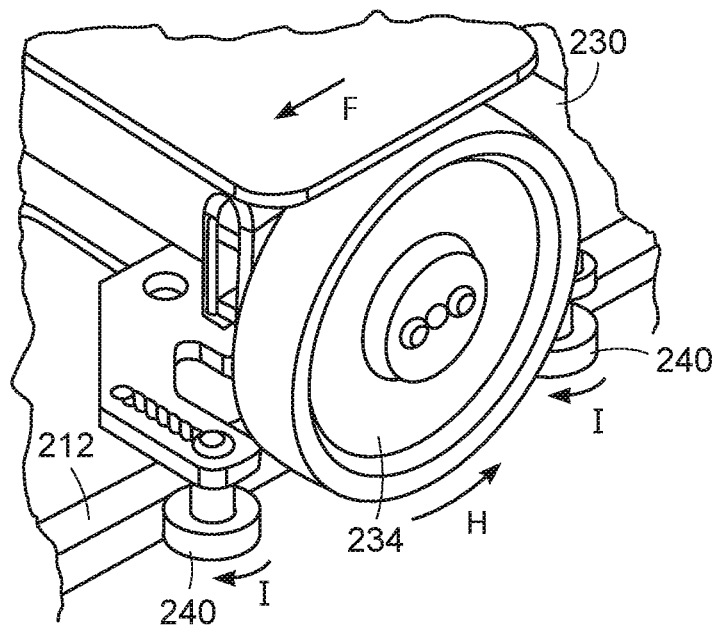
FIG. 26 shows an illustrative diagrammatic view of guide rollers of the carrier of FIG. 18 engaging a track section.

FIG. 25C shows the carrier 230 moving in a direction F as properly realigned by the track 212. FIG. 26 shows a close up view of the wheel 234 moving in a direction as shown at H to cause the carrier to move in the direction F, and further shows that the guide rollers 240 roll against the track 212 in directions as shown at I. The guide rollers 240 do not touch the ground (as does the wheel 234), but simply guide the direction of the carrier 230 by being urged against the track 212. In further embodiments, biasing means such as springs, elastics or pneumatics may be used to urge the guide rollers against the track, and in further embodiments, the tracks may be more triangular shaped at the edges to further facilitate reception of the carriers. If too much correction is required, however, the system may be operating inefficiently.

Systems of the invention therefore provide for binary steering of the automated carrier, allowing only bidirectional column and row travel in a grid. One pivot motor may be used for each pair of wheels, with a linkage to pivot the wheel modules. On other embodiments, one pivot motor and linkage could be used for all four wheels, or each wheel may have an independent pivot actuator. The system allows the wheels to follow square track sections by pivoting around rounded corners of the square track sections. The system does not require differential drive line/trajectory following, and keeps the orientation of the carrier fixed throughout all operations.

Figure 27:
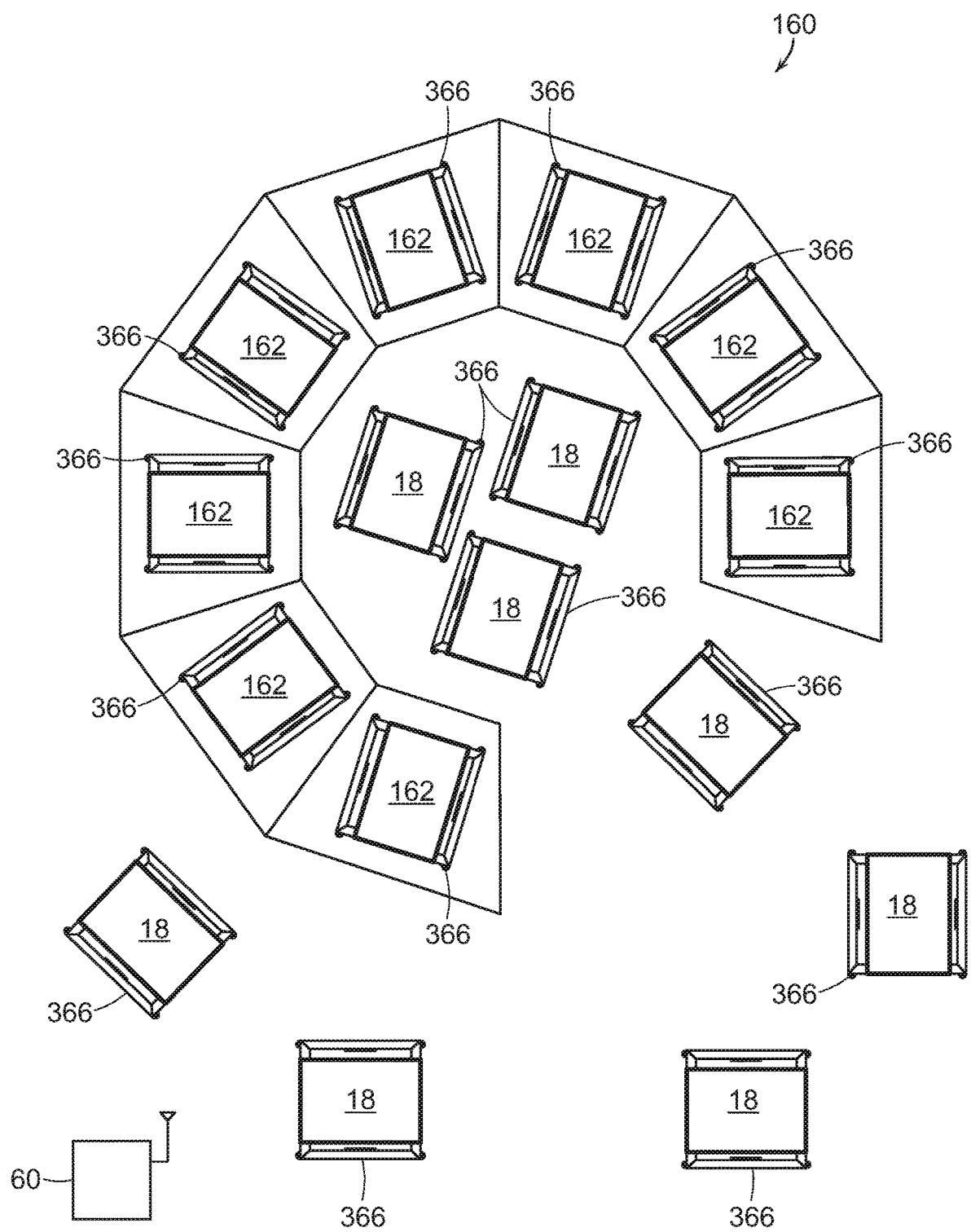
FIG. 27 shows an illustrative diagrammatic plan view of a storage, retrieval and processing system of a further embodiment of the present invention that includes destination containers of FIG. 9.

As shown in FIG. 27 (also in plan view), each set 160 of a stack, instead of containing bins as discussed above, may contain actuatable carriers 366 for both the storage and the distribution. Some of the carriers 366 would still move distribution bins 18 as discussed above, while other carriers 366 would contain the storages 162 of the objects similar to the bins or drawers 12 of FIGS. 11-3 and 11-13. The controllable carriers 366 may include omnidirectional wheels with or without track following technology, or pivotal wheel assemblies and rollers for following discontinuous tracks as discussed above. With this system, the maintenance of the storage of the objects within each tower may also be effected through the use of the actuatable carriers. In fact, the replenishment of the objects in the storages 162 may be accomplished at the same time as the retrieval of objects from the same set 160, providing a highly dynamic and fluid system.

Figure 28:
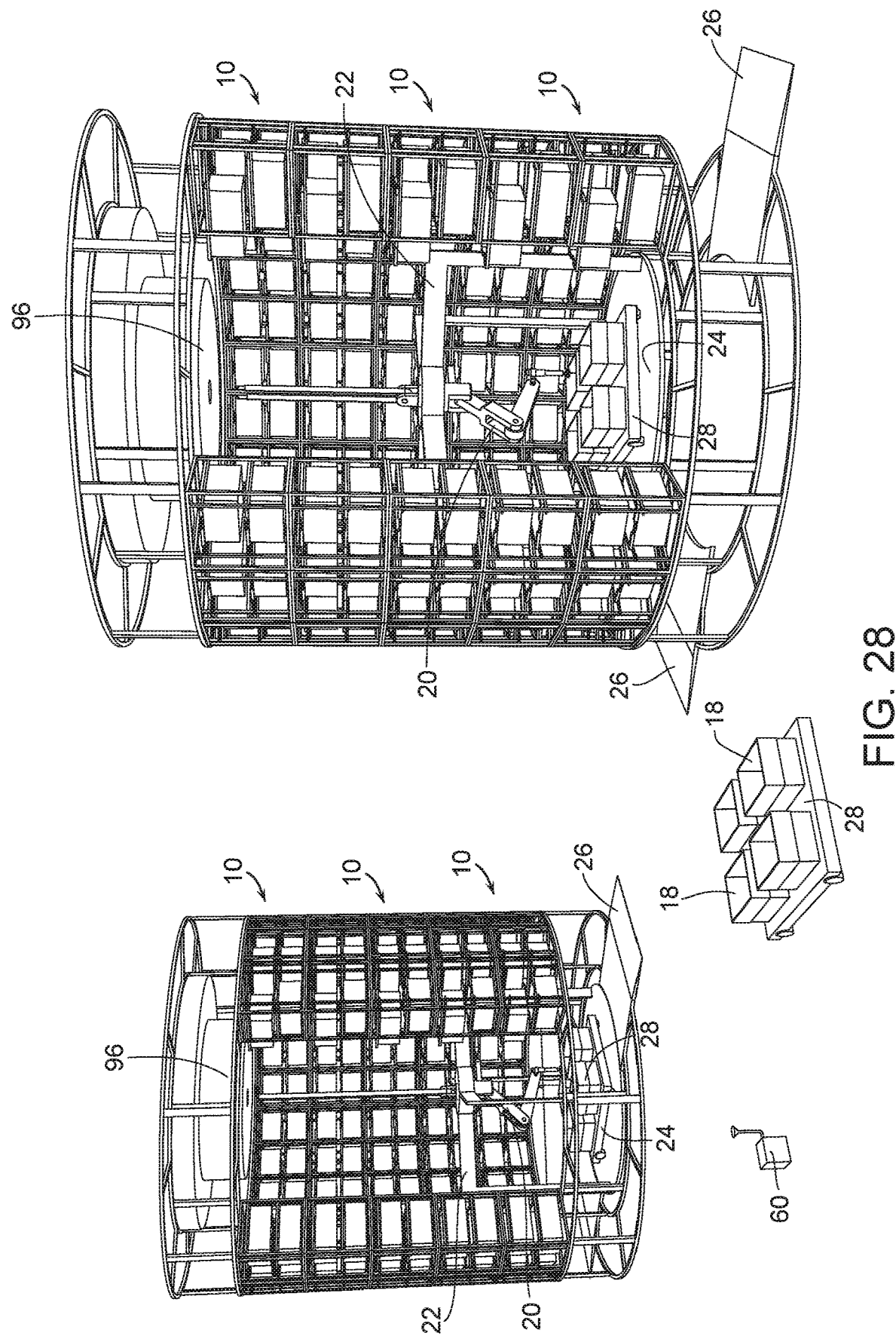
FIG. 28 shows a illustrative diagrammatic view of a storage, retrieval and processing system of a further embodiment of the present invention that includes multiple sets of multiple layers of arrays of bins.

Generally, adding more levels (and more bins) increases the object (SKU) capacity, and adding more towers (and articulated arms) increases the throughput. With reference to FIG. 28, the system (two systems are shown), may include instead of a plurality of bins within each tower, a single automated carrier 28 that moves as a unit among different towers, and the single automated carrier 28 may be raised and lowered on a floor of the movable platform 24 as the system access objects within bins on various layers. The single automated carrier 28 may include multidirectional wheels as discussed above with respect to wheels 100 that include rollers 102, or the carrier 24 may operate as skid-steer and turn by actuating opposing wheels in opposite directions. In accordance with further embodiments, one or more conveyors may be used to move bins (and carriers) between the towers, wherein the carriers for example, may drive on and off the conveyors.

Figure 29:
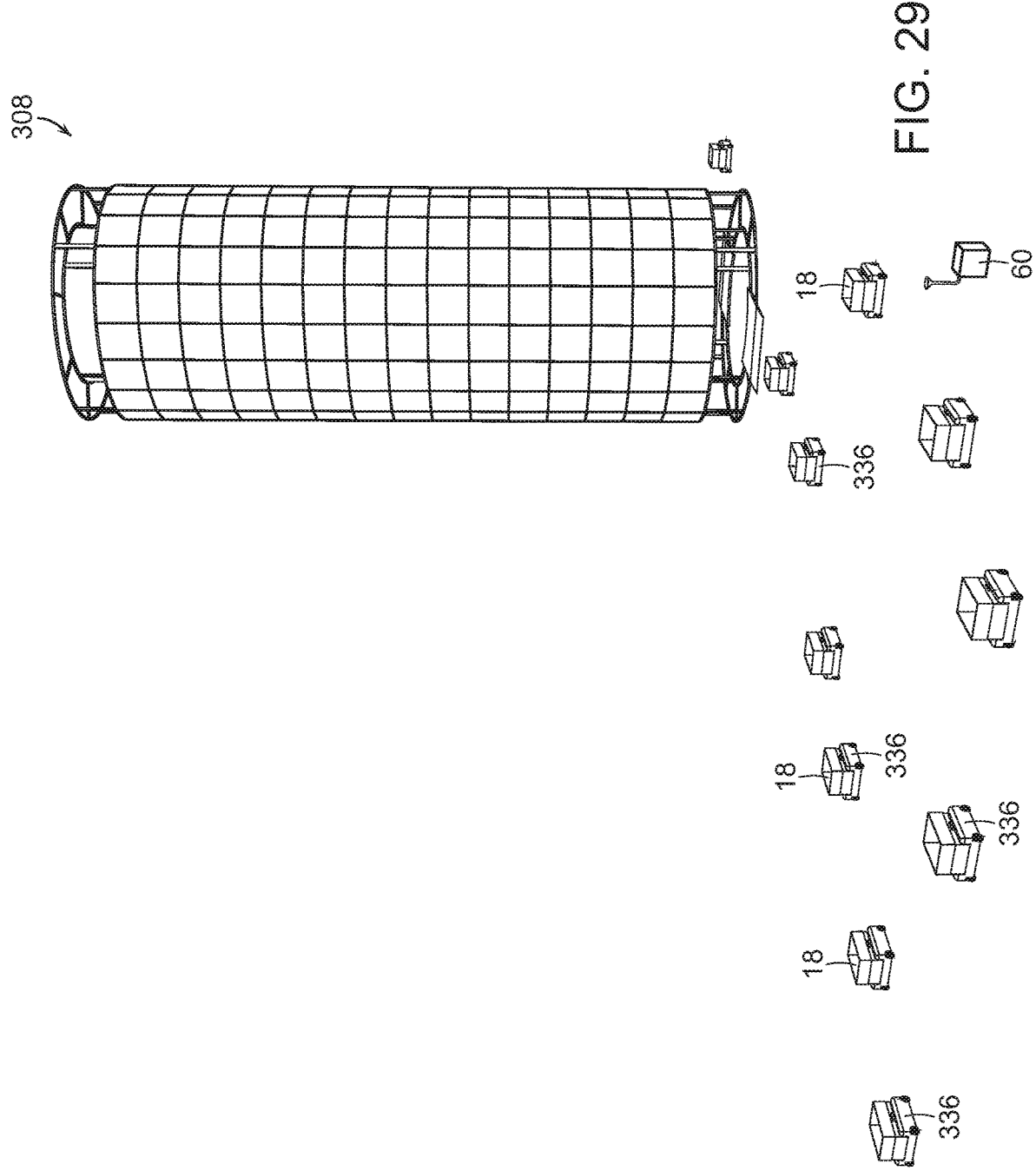
FIG. 29 shows an illustrative diagrammatic view of a storage, retrieval and processing system of a further embodiment of the present invention that includes a tower of multiple arrays of bins.
Figure 30:
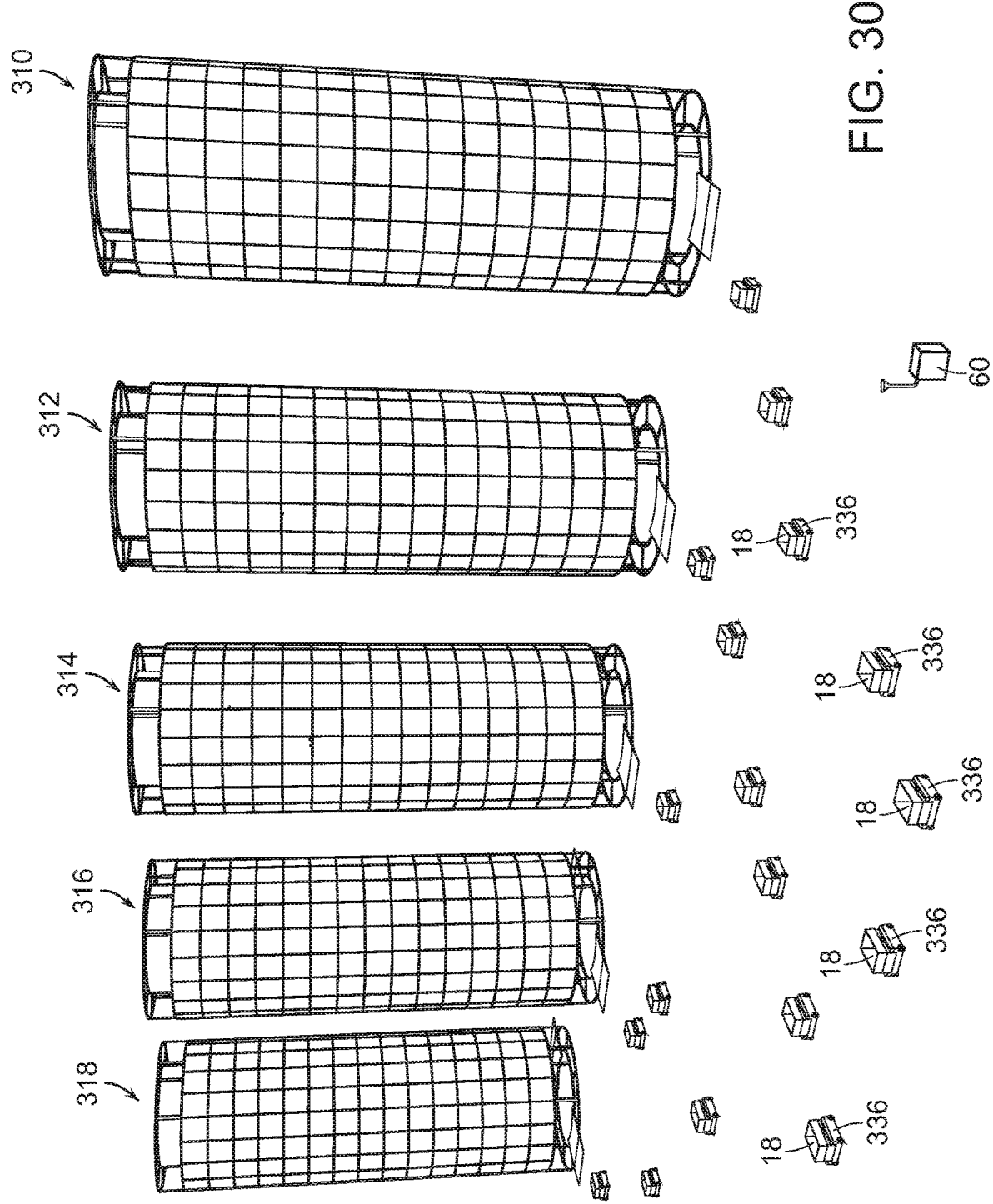
FIG. 30 shows an illustrative diagrammatic view of a storage, retrieval and processing system of a further embodiment of the present invention that includes a line of towers of multiple arrays of bins.
Figure 31:
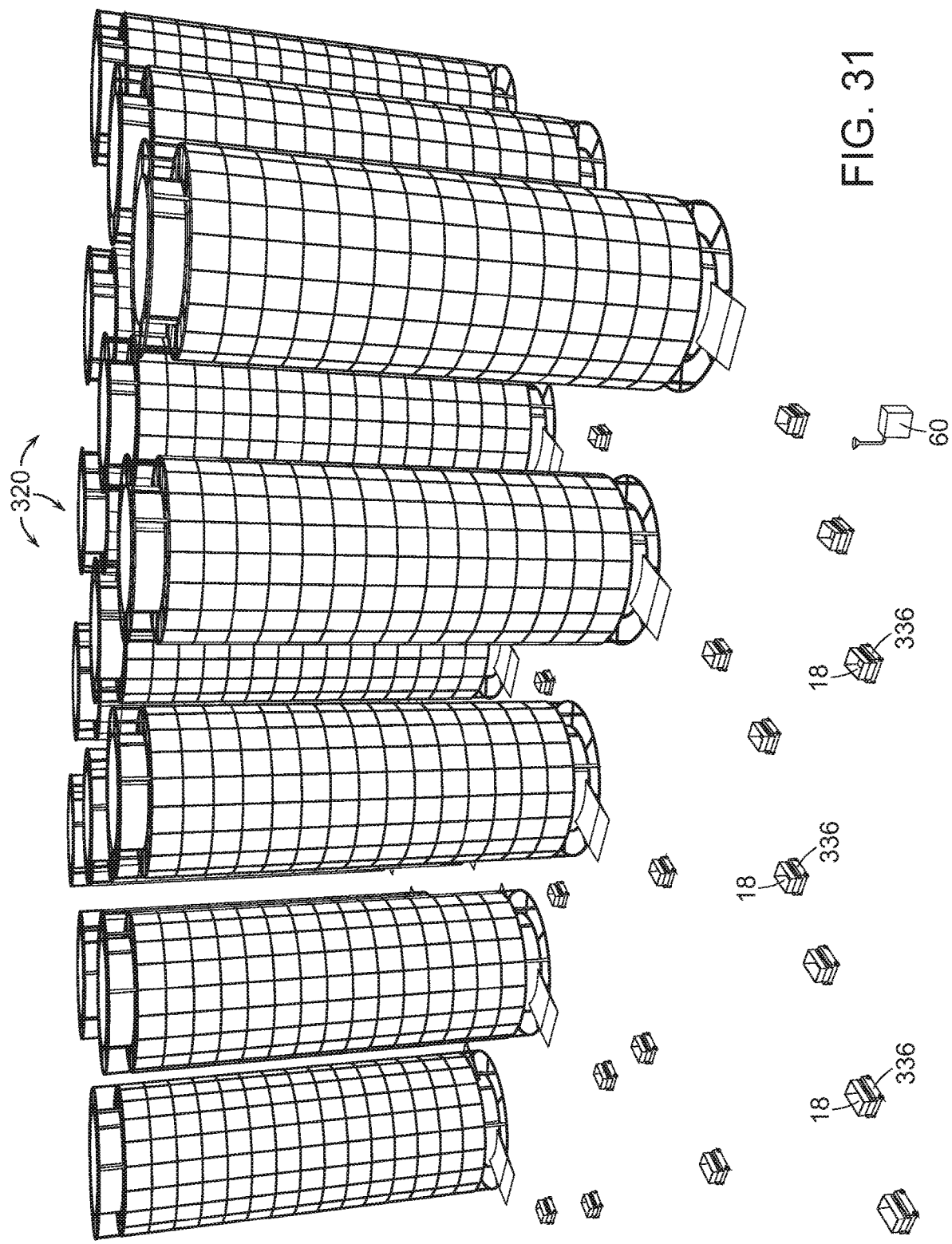
FIG. 31 shows an illustrative diagrammatic view of a storage, retrieval and processing system of a further embodiment of the present invention that includes an array of towers of multiple arrays of bins.

As further shown with reference to FIGS. 29-31, any number of such tower systems 308-320 may be provided within a workspace, processing bins of objects into destination bins 18 that may be provided in movable carriers 336 as discussed above with respect to previously discussed carriers, e.g., either with or without the tracks discussed above. The movable carriers 336, as well as the articulated arms 20 and automated drawers, are all in communication with a central computer system 60, or within the support structure 22, that directs the movement of all of these parts. Again, the controllable carriers 366 may, for example, include omnidirectional wheels with or without track following technology, or pivotal wheel assemblies and rollers for following discontinuous tracks as discussed above. In further embodiments, each of the towers may communicate with other towers, as well as an overall control system 60 that knows which bins of objects to be sorted are provided in each of the towers. For rarely selected objects, for example, the system may use one bin of one tower, and direct any destination bins to that tower that require the rarely selected object. In further embodiments, the control system 60 may control all of the devices and movable carriers, and all may communicate with one another via wireless communication.

Those skilled in the art will appreciate that numerous modifications and variations may be made to the above disclosed embodiments with departing from the spirit and scope of the present invention.

What is claimed is:

1. A storage, retrieval and processing system for processing objects, said storage, retrieval and processing system comprising:
a plurality of bins including objects to be distributed by the processing system, said plurality of bins being provided in at least a partially generally circular arrangement;
a programmable motion device that includes an end effector for grasping and moving any of the objects, said programmable motion device being capable of reaching any of the objects within the plurality of bins; and
a plurality of destination containers for receiving any of the objects from the plurality of bins, wherein one or more of the plurality of destination containers is provided on an automated carrier that is able to move along a discontinuous track system into and out of the at least partially generally circular arrangement of the plurality of bins carrying its respective one or more destination containers;
wherein the discontinuous track system comprises a plurality of discrete track sections spaced apart from one another, and wherein the automated carrier comprises a plurality of wheel assemblies that are pivotally mounted such that the automated carrier moves in a first direction from any of the plurality of discrete track sections to a first adjacent track section when the plurality of wheel assemblies are rotated to a first pivot position and moves in a second direction from any of the plurality of discrete track sections to a second adjacent track section when the plurality of wheel assemblies are rotated to a second pivot position, wherein the first direction and the second direction are mutually orthogonal.

2. The storage, retrieval and processing system as claimed in claim 1, wherein the plurality of bins is provided as a plurality of drawers.

3. The storage, retrieval and processing system as claimed in claim 1, wherein the processing system includes a plurality of stacks of a plurality of bins that are provided in at least a partially generally circular arrangement, and wherein the programmable motion device is movable among the plurality of stacks of the plurality of bins.

4. The storage, retrieval and processing system as claimed in claim 3, wherein the destination containers are positioned on a movable floor that is movable among the plurality of levels of the plurality of bins.

5. The storage, retrieval and processing system as claimed in claim 4, wherein the movable floor is coupled to a support structure to which the programmable motion device is attached.

6. A storage, retrieval and processing system for processing objects, said storage, retrieval and processing system comprising:
a plurality of vertically stacked levels of a plurality of bins including objects to be distributed by the processing system, said plurality of bins being provided in at least a partially generally circular arrangement;
a programmable motion device that includes an end effector for grasping and moving any of the objects, said programmable motion device being mounted onto a movable platform that is capable of moving vertically to and from each of the plurality of vertically stacked levels to reach any of the objects within the plurality of bins of the respective level; and
at least one destination container for receiving any of the objects from the plurality of vertically stacked levels of the plurality of bins, said at least one destination container being provided region on the movable platform that is disposed generally within the at least partially generally circular arrangement of the plurality of bins,
wherein the movable platform raises and lowers the programmable motion device together with the at least one destination container to any level among the plurality of vertically stacked levels.

7. The storage, retrieval and processing system as claimed in claim 6, wherein the plurality of bins are provided as a plurality of drawers.

8. The storage, retrieval and processing system as claimed in claim 6, wherein the at least one destination container is provided on an automated carrier that is able to move the at least one destination container onto the movable platform.

9. The storage, retrieval and processing system as claimed in claim 6, wherein the movable platform is coupled to a support structure to which the programmable motion device is attached.

10. The storage, retrieval and processing system as claimed in claim 9, wherein the programmable motion device is suspended from the support structure.

11. The storage, retrieval and processing system as claimed in claim 6, further comprising discontinuous track sections.

12. The storage, retrieval and processing system as claimed in claim 11, wherein the discontinuous track sections are provided as an array of discontinuous track sections.

13. The storage, retrieval and processing system as claimed in claim 11, wherein the at least one destination container is movable on one or more automated carriers, wherein each automated carrier comprises a plurality of wheel assemblies that are pivotally mounted such that the automated carrier moves in a first direction from any of the discontinuous track sections to a first adjacent track section when the plurality of wheel assemblies are rotated to a first pivot position and moves in a second direction from any of the discontinuous track sections to a second adjacent track section when the plurality of wheel assemblies are rotated to a second pivot position, wherein the first direction and the second direction are mutually orthogonal.

14. A method of storing, retrieving and processing objects, said method comprising the steps of:
providing a plurality of vertically stacked levels of a plurality of bins including objects to be processed, said plurality of bins being provided in at least a partially circular arrangement;
receiving at least one destination container carried by a movable carrier on a movable platform at least partially enclosed by the at least partially circular arrangement of the plurality of bins, wherein a programmable motion device including an end effector for grasping and moving any of the objects is mounted onto the movable platform;
raising the movable platform, including the movable carrier, the at least one destination container, and the programmable motion device, to any level among the plurality of vertically stacked levels to access at least one bin;
moving the end effector of the programmable motion device toward the at least one bin of the plurality of bins;
grasping an object from the at least one bin using the end effector;
moving the object with the end effector toward the at least one destination container;
placing the object in the at least one destination container with the end effector;
lowering the movable platform, including the movable carrier, the at least one destination container containing the object, and the programmable motion device, to a lower level among the plurality of vertically stacked levels; and
permitting the movable carrier carrying the at least one destination container to exit the movable platform.

15. The method as claimed in claim 14, wherein the plurality of bins is provided as a plurality of drawers.

16. The method as claimed in claim 14, wherein the movable platform is coupled to a support structure to which the programmable motion device is attached.

17. The method as claimed in claim 14, moving the carrier including the at least one destination container along a track system that includes a plurality of discontinuous track sections onto the movable platform.

18. The method as claimed in claim 17, wherein the plurality of discontinuous track sections are provided as an array of discontinuous track sections.

19. The method as claimed in claim 18, wherein the method further includes the step of changing a direction of movement of the movable carrier from a first direction to a second direction that is generally orthogonal to the first direction.

20. The method as claimed in claim 18, wherein the method further includes the step of moving the movable carrier including the at least one destination container move along the discontinuous track sections by actuating a plurality of wheel assemblies pivotally mounted on the carrier, wherein the carrier moves in a first direction from any of the discontinuous track sections to a first adjacent track section when the plurality of wheel assemblies are rotated to a first pivot position and moves in a second direction from any of the discontinuous track sections to a second adjacent track section when the plurality of wheel assemblies are rotated to a second pivot position, wherein the first direction and the second direction are mutually orthogonal.

* * * * *

UNITED STATES PATENT AND TRADEMARK OFFICE
CERTIFICATE OF CORRECTION

PATENT NO. : 10,649,445 B2
APPLICATION NO. : 15/922310
DATED : May 12, 2020
INVENTOR(S) : Thomas Wagner et al.

Page 1 of 1

It is certified that error appears in the above-identified patent and that said Letters Patent is hereby corrected as shown below:

In the Claims

In Claim 20, Column 14, Line 38 should read:
"carrier including the at least one destination container"

Signed and Sealed this
Sixteenth Day of June, 2020

Andrei Iancu
*Director of the United States Patent and Trademark Office*